US010507982B2

(12) United States Patent
Aalund et al.

(10) Patent No.: US 10,507,982 B2
(45) Date of Patent: Dec. 17, 2019

(54) GRAVITY FEED INVENTORY MANAGEMENT

(71) Applicant: Amazon Technologies, Inc., Seattle, WA (US)

(72) Inventors: Martin Peter Aalund, Seattle, WA (US); Jon Stuart Battles, North Bend, WA (US); David Henry Clark, Bellevue, WA (US); Ned Lecky, Vashon, WA (US); Jayson Michael Jochim, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 534 days.

(21) Appl. No.: 14/975,596

(22) Filed: Dec. 18, 2015

(65) Prior Publication Data
US 2017/0174436 A1    Jun. 22, 2017

(51) Int. Cl.
| | | |
|---|---|---|
| *B65G 37/00* | (2006.01) | |
| *B65B 43/42* | (2006.01) | |
| *B65G 11/06* | (2006.01) | |
| *B65G 11/08* | (2006.01) | |
| *G06Q 10/08* | (2012.01) | |
| *B07B 13/07* | (2006.01) | |

(Continued)

(52) U.S. Cl.
CPC .............. *B65G 37/00* (2013.01); *B07B 13/07* (2013.01); *B07C 5/04* (2013.01); *B65B 43/42* (2013.01); *B65G 1/08* (2013.01); *B65G 11/063* (2013.01); *B65G 11/081* (2013.01); *G06Q 10/087* (2013.01)

(58) Field of Classification Search
CPC ..................................................... B65G 30/00

USPC .......................................................... 705/28
See application file for complete search history.

(56) References Cited

U.S. PATENT DOCUMENTS

| | | | | |
|---|---|---|---|---|
| 274,302 | A * | 3/1883 | Flagg ...................... | B65G 1/08 |
| | | | | 186/22 |
| 2,893,746 | A * | 7/1959 | Cunningham .......... | B60B 19/06 |
| | | | | 280/836 |

(Continued)

FOREIGN PATENT DOCUMENTS

| | | |
|---|---|---|
| CN | 1203178 A | 12/1998 |
| CN | 101549342 A | 10/2009 |

(Continued)

OTHER PUBLICATIONS

International Search Report and Written Opinion for PCT Application No. PCT/US2016/067044 dated Apr. 3, 2017.

(Continued)

*Primary Examiner* — Fateh M Obaid
(74) *Attorney, Agent, or Firm* — Athorus, PLLC

(57) ABSTRACT

Described are systems, methods, and apparatus for managing the movement of inventory items within a materials handling facility using rollable containers and a gravity feed conveyance system. Inventory items are placed in the rollable containers and are routed to different locations within the materials handling facility along the gravity feed conveyance system, through use of gravitational forces that cause the rollable containers to roll. By using gravity to route inventory items within the materials handling facility, the energy and power requirements for the materials handling facility are reduced, which reduces overhead costs and which is better for the environment.

20 Claims, 25 Drawing Sheets

(51) Int. Cl.
*B07C 5/04* (2006.01)
*B65G 1/08* (2006.01)

(56) References Cited

U.S. PATENT DOCUMENTS

| | | | |
|---|---|---|---|
| 2004/0262326 A1* | 12/2004 | Christensen | B65G 1/08 |
| | | | 221/281 |
| 2012/0222938 A1* | 9/2012 | Rose, Jr. | G06Q 20/18 |
| | | | 198/572 |
| 2014/0103062 A1* | 4/2014 | Rose, Jr. | G07F 7/0609 |
| | | | 221/124 |
| 2014/0312051 A1 | 10/2014 | Rose et al. | |

FOREIGN PATENT DOCUMENTS

| | | |
|---|---|---|
| CN | 202984121 U | 6/2013 |
| DE | 202013101987 U1 | 8/2013 |
| FR | 2852305 B1 | 12/2008 |
| JP | S53110679 U | 9/1978 |
| JP | S61206504 A | 9/1986 |
| JP | S61206504 U | 12/1986 |
| KR | 20060105697 A | 10/2006 |

OTHER PUBLICATIONS

Sun Hong-Ying: "The Application of Barcode Technology in Logistics and Warehouse Management", Education Technology and Computer Science, 2009. ETCS '09, First International Workshop on, IEEE, Piscataway, NJ, USA, Mar. 7, 2009, pp. 732-735, XP031459071, ISBN: 978-1-4244-3581-4.

Search Report dated May 31, 2019, for Chinese Patent Application No. 201680073942.X.

* cited by examiner

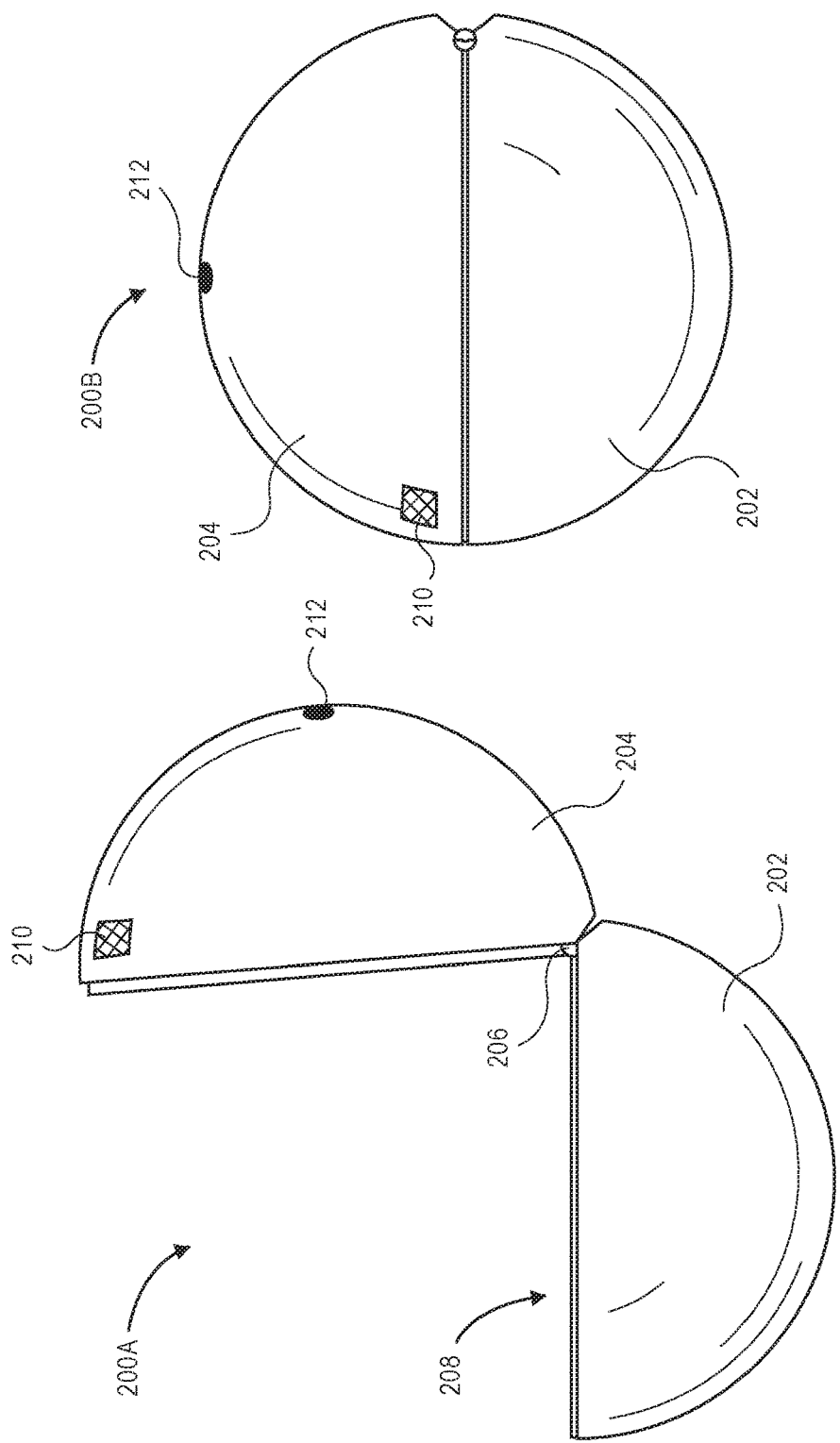

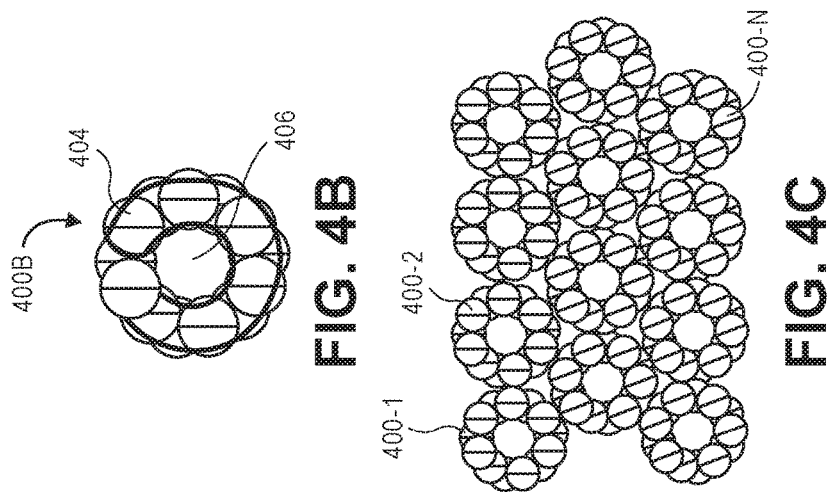
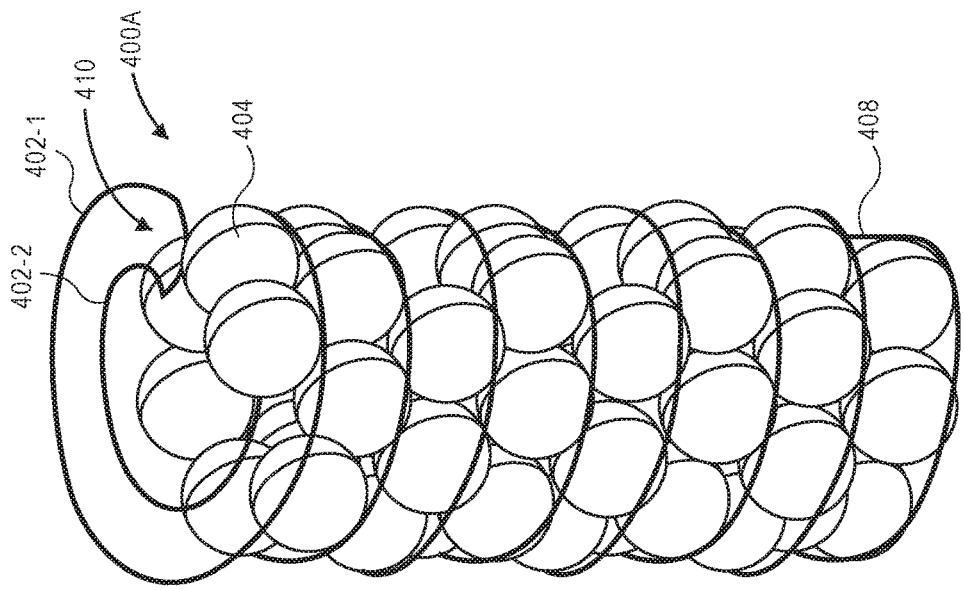

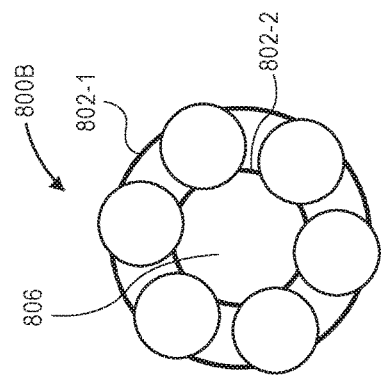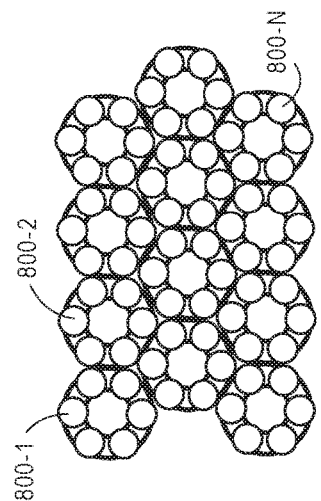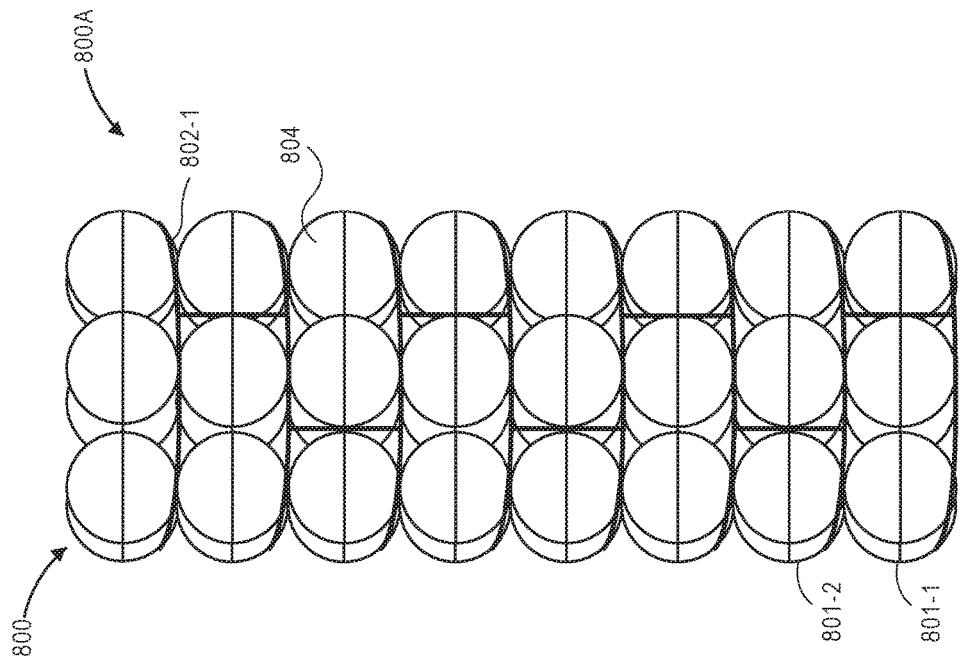

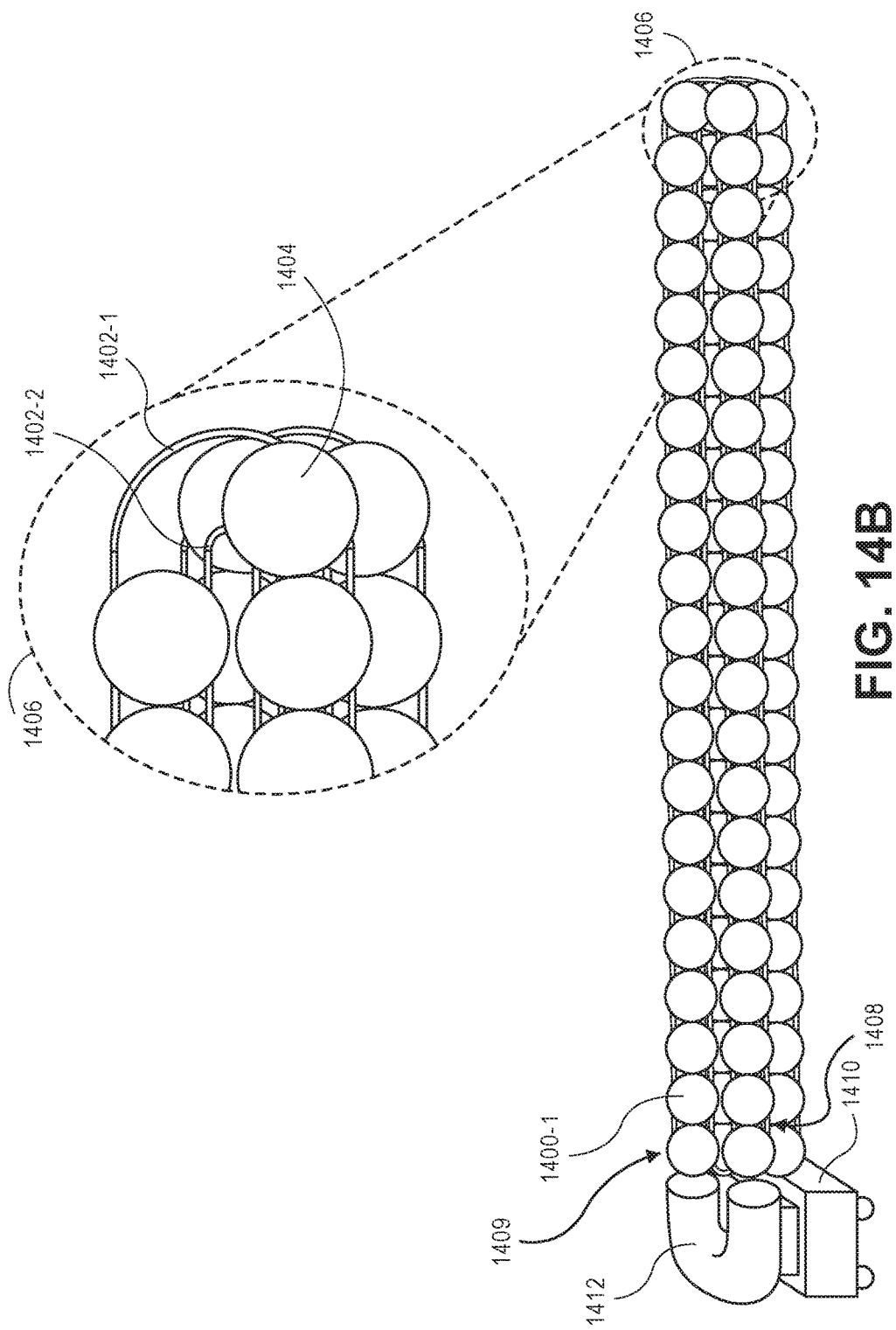

GRAVITY FEED INVENTORY MANAGEMENT

BACKGROUND

Many companies package items and/or groups of items together for a variety of purposes, such as e-commerce and mail-order companies that package items (e.g., books, CDs, apparel, food, etc.) to be shipped to fulfill orders from customers. Retailers, wholesalers, and other product distributors (which may collectively be referred to as distributors) typically maintain an inventory of various items that may be ordered by clients or customers. This inventory may be maintained and processed at a materials handling facility that may include, but is not limited to, one or more of: warehouses, distribution centers, cross-docking facilities, order fulfillment facilities, packaging facilities, shipping facilities, or other facilities or combinations of facilities for performing one or more functions of material (inventory) handling.

Materials handling facilities typically store inventory items in their own packaging and on shelves, pallets, or racks. Such packaging and inventory storage requires that the inventory items be moved between locations within the materials handling facility using human power or mechanical power (e.g., forklifts, carts, trollies). For example, when items are received into a materials handling facility they are often removed from a transportation unit, such as a truck, with mechanical power of a forklift. A human may then process the received items and physically move the items to a storage area, using human power or mechanical assistance. Likewise, when an item is ordered, a human and/or mechanical device must pick the item from inventory and transport the item to a packing station and/or shipping station.

BRIEF DESCRIPTION OF THE DRAWINGS

The detailed description is set forth with reference to the accompanying figures. In the figures, the left-most digit(s) of a reference number identifies the figure in which the reference number appears.

FIGS. 2A-2B illustrate an example of a rollable container configured to contain one or more inventory items, according to an implementation.

FIGS. 4A-4C illustrate an example helical rollable container holder, according to an implementation.

FIGS. 8A-8C illustrate an example hexagonal stacked rollable container holder, according to an implementation.

FIG. 14B illustrates an expanded view of a portion of a horizontal grid rollable container holder, according to an implementation.

Figure 1:
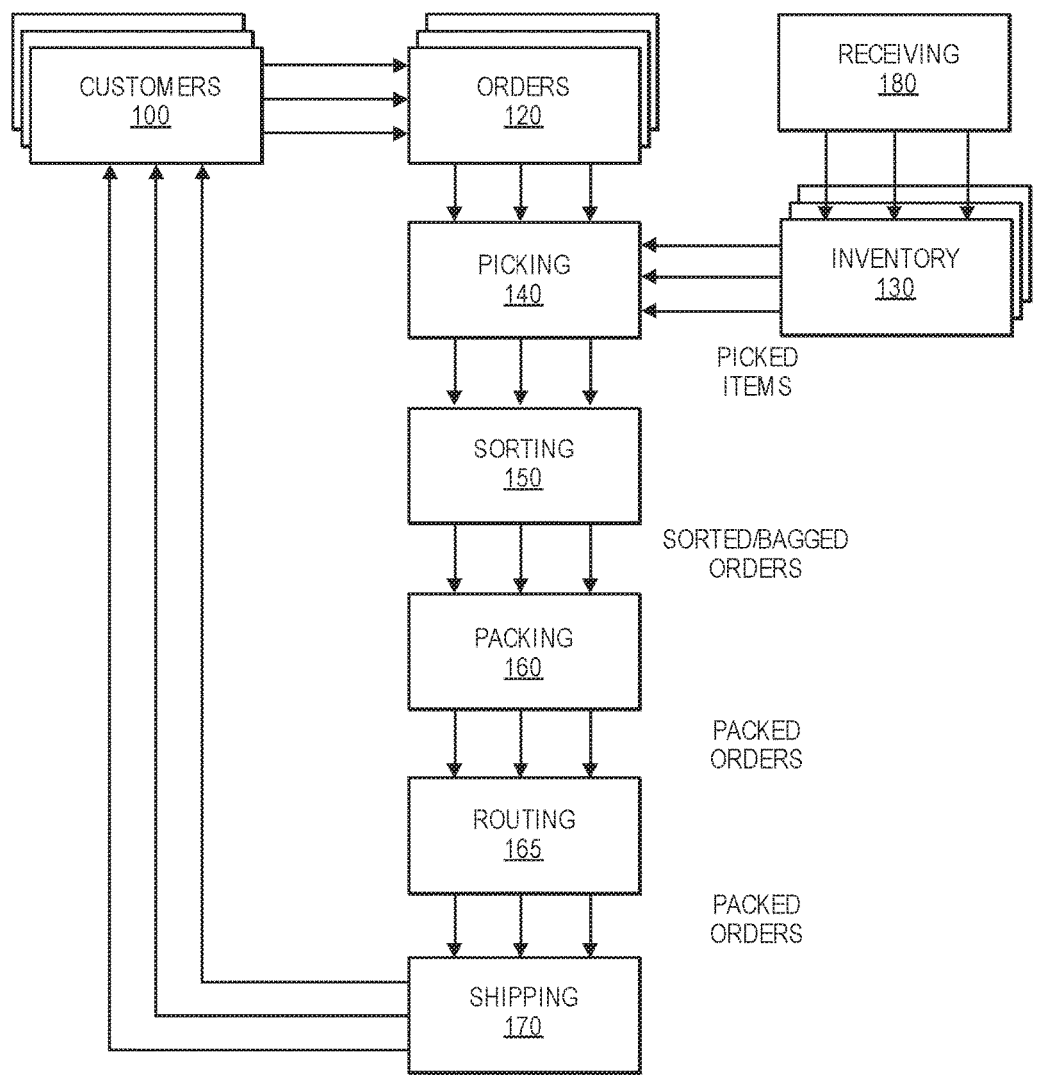
FIG. 1 illustrates a broad view of the operations of a materials handling facility, according to an implementation.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "Includes" mean including, but not limited to.

DETAILED DESCRIPTION

Described are systems, methods, and apparatus that utilize gravity to transport, sort, and/or sequence items within a materials handling facility. Inventory items may be placed in rollable containers that will roll when positioned on a sloping surface. In some implementations, the inventory items may arrive at the materials handling facility already contained in rollable containers or the items may be placed into rollable containers as part of a receive process.

The rollable containers may be different sizes and/or shapes to accommodate different sizes and shapes of inventory items. To improve storage utilization, inventory items contained in like size and/or shape rollable containers may be sorted and stored together. For example, a gravity feed conveyance system may be positioned throughout the materials handling facility upon which rollable containers may be rolled, using gravitational forces, between locations. Likewise, at each rollable container holder a pair of rails corresponding to a size of rollable container to be stored at that rollable container holder may terminate and/or separate so that appropriately sized rollable containers are automatically routed to that rollable container holder.

The rollable container holders may be configured to store rollable containers in a stacked configuration, such as a helix, hexagonal, cube, or row configuration. In a helical rollable container holder, rollable containers may be inserted into a top of the helical rollable container holder and roll, using gravitational forces, into an open position within the helical rollable container holder. As more rollable containers are added, the helical rollable container holder is filled, with each rollable container rolling into the helical rollable container holder and resting against an adjacent rollable container. If a rollable container is removed from the helical rollable container holder, any containers positioned above the removed container automatically shift, under the force of gravity, so that the position of the removed rollable container is filled with the adjacent rollable container. This shift continues up the helical rollable container holder such that the open position is above the last stored rollable container.

Regardless of the configuration, when a rollable container is removed from a rollable container holder it may be positioned back onto the gravity feed conveyance system and roll to another location within the materials handling facility, again using gravitational forces.

In some implementations, the materials handling facility may also include an engagement mechanism that may be used to engage and move the rollable containers to higher locations within the materials handling facility. Such engagement mechanisms may include human operators, robotic units, pneumatic air handling, etc. Likewise, to facilitate gravitational based movement of rollable containers within a materials handling facility, the materials handling facility may be designed such that the standard flow of items through the facility is arranged so that the items typically flow downhill. For example, a receive station may be a highest altitude station within the materials handling facility and a shipping station may be a lowest altitude station in the materials handling facility. Items typically flow from receive to shipping, as discussed further below.

A packaging information system configured to facilitate picking, packing and/or shipping operations may include various components used to facilitate efficient and/or cost-effective operations in a materials handling facility. For example, in various implementations, a packaging information system may include a planning service, a product dimension estimator, and/or a rollable container selection service for selecting a rollable container into which an item is to be stored. For example, the product dimension estimator may provide information as to the size and/or shape of the item to be placed in a rollable container and the rollable container selection service may select an appropriately sized rollable container.

As used herein, the term "item package" may refer to a single item to be stored, shipped, or otherwise enclosed within a rollable container, alone, or to multiple items that have been grouped for shipping, storing or for any other operations within a materials handling facility, such as for storing together in a rollable container.

By leveraging gravitational forces to move rollable containers that contain inventory items within a materials handling facility, the power and energy requirements required for facility operations are reduced. Such reductions result in a lower cost of operation and is better for the environment.

A block diagram of a materials handling facility which, in one implementation, may be an order fulfillment facility configured to utilize various systems and methods described herein, is illustrated in FIG. 1. In this example, multiple customers 100 may submit orders 120 to a distributor, e-commerce website, retailer, etc., where each order 120 specifies one or more items from inventory 130 to be shipped to the customer or to another entity specified in the order. An order fulfillment facility typically includes receiving operations 180 for receiving shipments of items from various vendors and storing the received items in inventory 130. In some implementations, the receiving operations or receive station may be a highest altitude station in the fulfillment center such that all item movement and/or processing performed within the materials handling facility occurs at a lower altitude or height than the receiving operations.

Figure 3A:
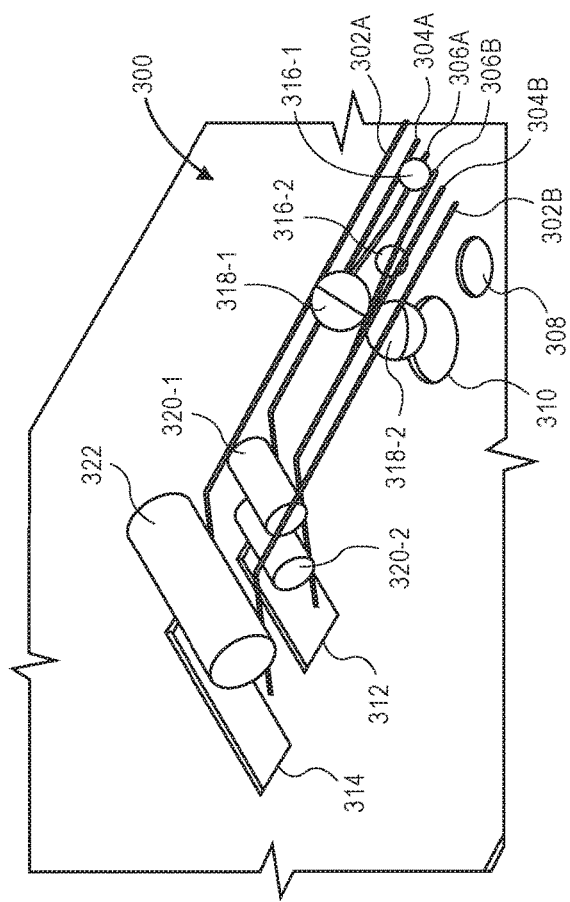
FIGS. 3A-3C illustrate an example gravity feed conveyance system for transporting and sorting rollable containers using the force of gravity and the sizeshape of the rollable containers, according to an implementation.
Figure 3C:
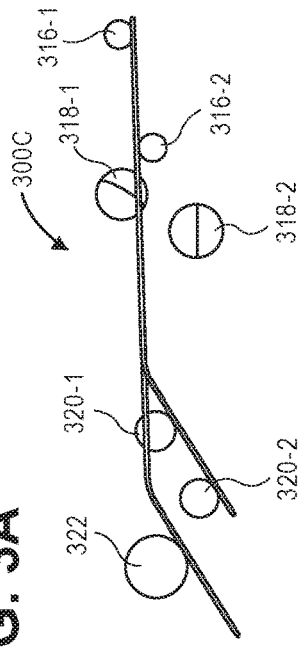
Figure 3B:
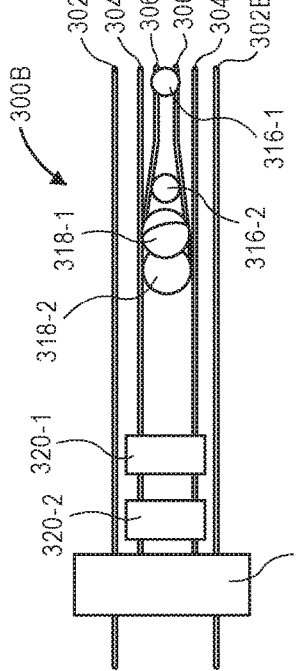

As discussed further below, in some implementations, items may be received in the materials handling facility already contained in rollable containers. In such an implementation, the transportation unit containing the rollable containers that include the items may be positioned so that the rollable containers will roll out of the transportation unit, under the force of gravity. When the rollable containers exit the transportation unit they roll onto a gravity feed conveyance system that, as discussed further below with respect to FIGS. 3A-3C, is used to route, sort, and/or sequence the rollable containers to different rollable container holders within the materials handling facility for storage and/or to transport the rollable containers to other locations within the materials handling facility. In such an implementation, other than opening an access point on the transportation unit (e.g., a door), no human, electrical, or mechanical power is needed to offload the rollable containers from the transportation unit and route the rollable containers to different rollable container holders within the materials handling facility.

In other implementations, as items are received at receiving operations 180, an agent, such as a human or robotic unit, may place the items into rollable containers for storage in the materials handling facility. One or more items may be placed into a rollable container. In some implementations, in which multiple items are placed into a single rollable container, it may be required that the items be of a same type (e.g., same type and size memory card, items with a common barcode or stock keeping unit ("SKU")). Any size and/or weight item may be placed in an appropriately sized rollable container. Accordingly, items varying from less than an inch in height, width, and/or length to items having dimensions of several feet may be placed in a rollable container. Likewise, items ranging in weight from ounces to hundreds of pounds may be stored in rollable containers and moved about the materials handling facility by rolling the rollable container.

In some implementations, items stored in rollable containers may be placed in larger rollable containers. For example, small individual items may be placed in small rollable containers and those rollable containers may be placed in a larger rollable container.

Once received items are placed in a rollable container, the rollable container may be placed on a gravity feed conveyance system so that the rollable container will roll along the gravity feed conveyance system under the force of gravity and be automatically routed, sorted, and/or sequenced to a rollable container holder, as discussed below with respect to FIGS. 3A-3C. The inventory area 130 may, in some implementations, be a second highest station in the materials handling facility such that the gravity feed conveyance system between the receiving operations 180 and inventory area 130 has a downward slope to enable rolling of the rollable containers along the gravity feed conveyance system between the receiving station, the inventory area, and other stations within the materials handling facility.

To fulfill the orders 120, the one or more items specified in each order may be retrieved or "picked" from inventory 130 (which may also be referred to as a rollable container holder) in the order fulfillment facility, as indicated by picking operations 140. The picking may be done by an agent picking a rollable container that contains the item and placing the picked rollable container on the gravity feed conveyance system so that the rollable container rolls along the gravity feed conveyance system under the force of gravity to a sorting 150, packing 160 or shipping 170 operation. In other implementations, a rollable container may be mechanically released from a rollable container holder such that it rolls from rollable container holder, onto the gravity feed conveyance system, and rolls to the sorting 150, packing 160 or shipping 170 operations under the force of gravity. For example, as discussed below with respect to FIGS. 4A-4C, the rollable container at the bottom of the helical rollable container holder may be released from the helical rollable container holder and roll, under the force of gravity, to the sorting 150, packing 160 or shipping 170 operations along a gravity feed conveyance system.

As another example, discussed further below with respect to FIGS. 4A-4C, and 7A-8C, the rollable container that contains the ordered item may be pushed by an agent from a storage position on the rollable container holder such that it enters the cavity formed within the rollable container holder between other rollable containers stored at the rollable container holder. When the rollable container enters the cavity, it falls under the force of gravity through the vertical portion of the rollable container holder and onto a gravity feed conveyance system positioned below the cavity of the rollable container holder. Once on the gravity feed conveyance system, the rollable container will roll under the force of gravity from the rollable container holder to a sorting 150, packing 160 or shipping 170 operation.

In still other examples, the rollable containers may be routed along the gravity feed conveyance system directly from the inventory area 130 to the shipping operations 170. The item may be removed from the rollable container prior to shipping, or the rollable container that contains the item may be shipped. For example, if the item is being transported to another materials handling facility it may be placed on a transportation unit without being removed from the rollable container.

Note that not every fulfillment facility may include both sorting and packing stations. In certain implementations, picked items may be transferred directly to a packing station, while in other implementations picked items may be transported to a combination sort, and packing station. This may result in a stream and/or batches of picked rollable containers that includes corresponding items for multiple incomplete or complete orders being delivered to a sort and pack station for sorting and packing operations 160 into their respective item packages for packing and shipping, according to some implementations.

Because rollable containers that include items of an item package may be received at different times, sorting operations 150 and packing operations 160 may have to wait for one or more rollable containers that include items of some item packages to be delivered to the sort and pack station(s) before processing of the item package completes. Likewise, if rollable containers that include items arrive at sorting operations 150 out of the sequence specified by the stacking engine, those rollable containers may be held at sorting operations 150 until other rollable containers with items arrive before releasing the rollable containers to packing operations 160. Releasing rollable containers that include items from the sorting operations 150 in a specified sequence allows for multiple items of multiple orders to be picked and routed along the gravity feed conveyance system and under the force of gravity and delivered to sorting independent of one another without disrupting the sequence specified by the stacking engine. This is important because some rollable containers may roll along the gravity feed conveyance system faster than other rollable containers. By restoring the sequence during sorting operations 150, the rollable containers that include ordered items will be delivered to the packing operations 160 and arrive at the pack stations in, or approximately in, the sequence specified by the inventory management system.

A package routing operation 165 may sort packed orders to one of two or more shipping operations 170, from which they may be shipped to the customers 100. Depending on the specific implementation, the package routing operation 165 may be either automated or manual. The package routing operation 165 may receive an indication of the destination to which each packed shipment set should be routed. In some instances, the destination may be the final destination identified by the user or a destination at which transfer of a shipment set may occur for final delivery to the user. The package routing operation 165 may also determine a routing destination for each packed shipment set dependent on the size of a shipping package in which the shipment set is contained and/or based on whether the shipment set will be delivered by a carrier or other shipment method.

Note that a picked, packed, and shipped item package does not necessarily include all of the items ordered by the customer; a shipped package may include only a subset of the ordered items available to ship at one time from one fulfillment facility. Also note that the various operations of an order fulfillment facility may be located in one building or facility, or alternatively may be spread or subdivided across two or more buildings or facilities.

The arrangement and order of operations illustrated by FIG. 1 is merely one example of many possible implementations of the operations of an order fulfillment facility. Other types of materials handling, manufacturing, or order fulfillment facilities may include different, fewer, or additional operations and resources, according to different implementations. For example, the operations may be performed in a different order. In such an example, the altitude or height of the operations within the materials handling facility may altered so that gravity can be used to roll rollable containers between operations.

FIGS. 2A-2B illustrate an example of a rollable container 200 configured to contain one or more inventory items, according to an implementation. In FIG. 2A, the rollable container 200A is illustrated in an open position. In FIG. 2B the rollable container 200B is illustrated in a closed position. In the illustrated examples, the rollable container 200 includes an upper portion 204 and a lower portion 202 that join to encase one or more items within the interior 208 of the rollable container.

In this example, the upper portion 204 and the lower portion 202 are joined by a hinge or joint 206 that allows the upper portion 204 and the lower portion 202 to rotate with respect to one another to either open or close, thereby providing access to item(s) included in the interior 208 of the rollable container. In other implementations, the portions of the rollable container may be secured using other means. For example, or in addition to a hinge 206, the upper portion 204 and lower portion 202 of the rollable container may be joined using magnets, electromagnets, latches, hooks, by screwing the two portions together, and/or other mechanisms to secure the upper portion 204 with the lower portion 202.

The interior 208 of the rollable container may include a protective material that protects and secures the item(s) placed in the interior 208 of the rollable container 200 so the items do not move around the interior 208 of the rollable container 200 when the rollable container 200 is rolling. For example, the upper portion 204 and the lower portion 202 may each include a flexible membrane or flexible webbing formed of rubber or other flexible material that, when the upper portion and the lower portion of the rollable container 200 are closed, envelops the items placed in the interior of the rollable container 200 so they are securely positioned and contained within the interior of the rollable container 200.

In some implementations, the rollable container 200 may include an identifier 210. The identifier may be any form of identifier. For example, the identifier may be a visual identifier, an audible identifier, a radio frequency identification ("RFID") tag, and/or any combination thereof. In implementations in which a visual identifier is utilized, the visual identifier may be a bar code, bokode, quick response ("QR") code, illumination element that transmits a unique light pattern, a color, etc. In implementations in which the identifier is an audible identifier, the rollable container 200 may include a speaker that transmits a unique tone or series of tones that uniquely identify the rollable container. In implementations in which the identifier is a RFID tag, the rollable container may include a RFID tag, such as a passive RFID tag, or active RFID tag that can transmit a radio frequency that includes a unique identifier.

Regardless of the type of identifier utilized, items placed in the rollable container 200 may be associated with the unique identifier of the rollable container and the unique identifier of the rollable container 200 may be used to track and maintain a location within the materials handling facility of the item(s) included in the interior of the rollable container 200. Likewise, when the rollable container is stored at a position in a rollable container holder, a position identifier representative of that position may be associated with the rollable container identifier so that the location of the rollable container, and thus the contained item(s), within the materials handling facility is known.

In some implementations, an inventory management system operating on a computing system, such as the computing system discussed below with respect to FIG. 19, may maintain in a data store an association between the rollable container identifier, item identifiers, and position identifiers within the materials handling facility. When an item is ordered, the inventory management system may generate picking, routing, packing, and shipping instructions that cause the rollable container that includes the item to be picked from a position in a rollable container holder and routed along a gravity feed conveyance system to packing and shipping operations.

Returning to FIG. 2A, the rollable container 200 may also include one or more engagement locations 212 that may be used by an engagement mechanism to engage the rollable container 200 and move the rollable container using a force other than gravity. In this example, the engagement location 212 is an opening in the exterior surface of the rollable container and the engagement mechanism may be configured to position a hook or arm in the opening such that it engages the rollable container and lifts the rollable container for movement. In other implementations, the engagement location 212 may utilize other forms of engagement. For example, the engagement location of the rollable container 200 may include a metal surface and the engagement mechanism may include a magnet or an electromagnet that may be used to couple with the rollable container and lift or otherwise move the rollable container. In some implementations, the entire rollable container may include a metal surface such that any portion of the rollable container may be utilized as the engagement location 212.

The rollable container illustrated in FIGS. 2A-2B has a spherical shape. In other implementations, the rollable container may be cylindrical, ovoidal or any other geodesic shape that will facilitate rolling along a gravity feed conveyance system under the force of gravity.

Figure 2C:
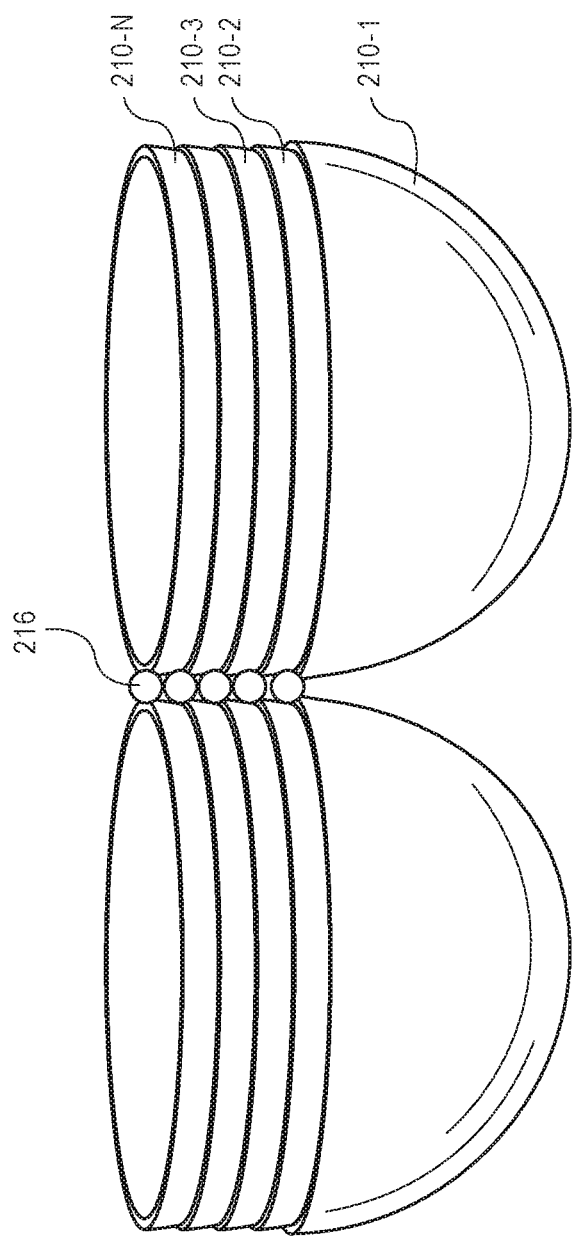
FIG. 2C illustrates an example of nested rollable containers for storage, according to an implementation.

FIG. 2C illustrates an example of nested rollable containers 210, according to an implementation. Some shapes of rollable container that utilize a hinge may be stacked in a nested configuration when the rollable containers are not being used to store inventory items. In FIG. 2C, rollable containers 210-1, 210-2, 210-3-210-N are opened at the hinge 216 of each rollable container and stacked in a nested configuration. By stacking the rollable containers in a nested configuration, a larger number of rollable containers may be stored in the same amount of floor space.

Figure 2D:
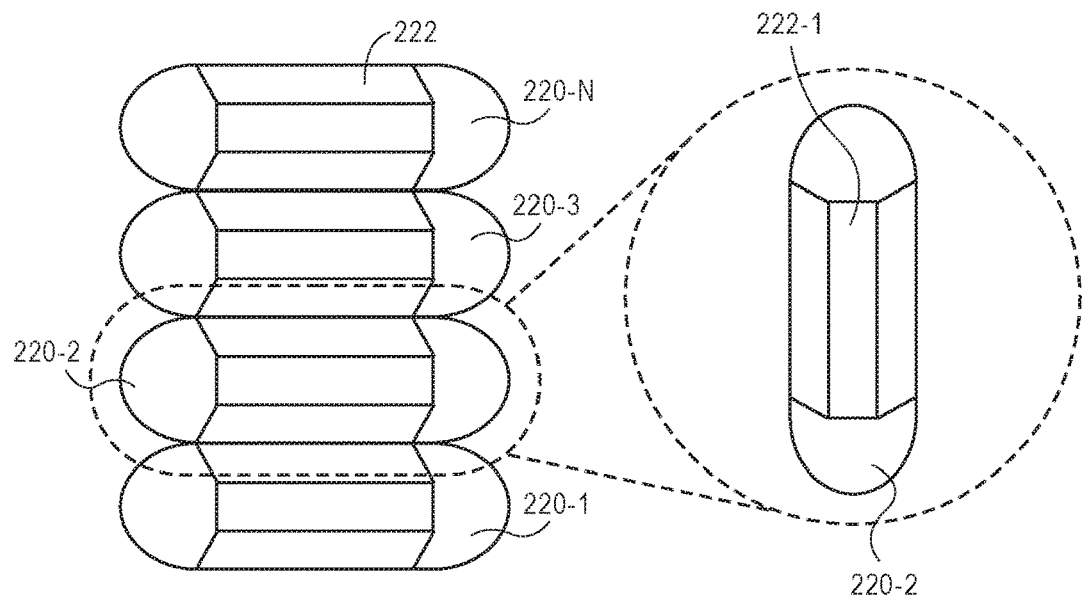
FIGS. 2D-2E illustrate examples of stacking rollable containers for storage, according to an implementation.
Figure 2E:
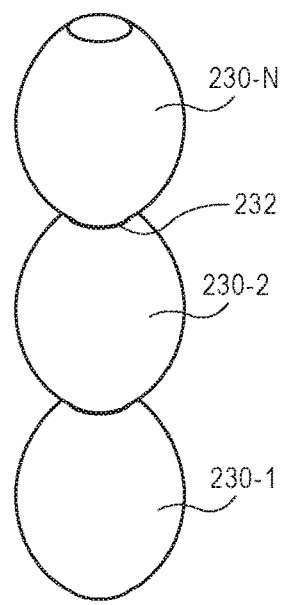

FIGS. 2D-2E illustrate examples of stacked rollable containers, according to an implementation. In some implementations, rollable containers may include two or more substantially flat surfaces so that the rollable containers can be stacked without any additional supporting materials. For example, FIG. 2D illustrates an example of a plurality of ovoidal shaped rollable containers 220-1, 220-2, 220-3-220-N that each include at least two substantially flat surface areas on opposing sides of the rollable containers 220. For example, referring to the expanded view, rollable container 220-2 includes a first substantially flat surface 222-1 on a first side and the first substantially flat surface 222-1 lies in a first plane. On the opposing side (not visible) of the rollable container 220-2 is another, similarly shaped, substantially flat surface that lies in a second plane that is approximately parallel with the first plane in which the first substantially flat surface 222-1 lies.

The rollable containers may be stacked by placing the rollable containers such that substantially flat surfaces of adjacent rollable containers contact one another. Because the planes formed by opposing sides substantially flat surfaces of the rollable container 210 are approximately parallel, when one substantially flat surface of the rollable container is positioned on a surface (or another rollable container) the opposing substantially flat surface will be in a position to receive another rollable container.

In ovoidal shaped rollable containers, by positioning the substantially flat surfaces toward a widest part of the ovoid, as illustrated, the rollable container is still shaped such that it will roll along the gravity feed conveyance system, with the rails of the gravity feed conveyance system positioned on the non-flat portions of the rollable container. In other implementations, the substantially flat surfaces may be at other positions on the rollable container.

As illustrated, the rollable container may have more than two substantially flat surfaces that are on opposing sides and that lie in approximately parallel planes. For example, substantially flat surface 222-1 of rollable container 220-2 has an opposing flat surface that lies in a parallel plane. In general, any number of pairs or sets of opposing flat surfaces may be included on a rollable container.

FIG. 2E illustrates another example of rollable containers 230 that include opposing flat surfaces 232 to facilitate stacking of the rollable containers, according to an implementation. In this example, the flat surfaces are formed at the ends of the rollable containers 230 such that the rollable containers 230 can be stood on-end and stacked, as illustrated. In this example, rollable containers 230-1, 230-2-230-N are stacked vertically end-to-end. Any number of rollable containers may be stacked.

FIGS. 3A-3C illustrate an example gravity feed conveyance system 300 for transporting, sorting and/or sequencing rollable containers using the force of gravity to facilitate transport and the size and/or shape of the containers for sorting, according to an implementation. Turning first to FIG. 3A, the gravity feed conveyance system 300 utilizes rails to enable transport and sorting of the rollable containers 316-1, 316-2, 318-1, 318-2, 320-1, 320-2, 322. Specifically, in this example, the gravity feed conveyance system includes a first rail 306A and a second rail 306B aligned substantially parallel and having a first spacing between the first rail 306A and the second rail 306B that is less than a critical dimension of the rollable containers 316-1 and 316-2 so that the rollable containers 316-1 and 316-2 will contact and roll upon the first rail 306A and the second rail 306B under the force of gravity.

As used herein, "critical dimension" generally refers to the longest distance between the surfaces of a rollable container. If the container is a sphere, the critical dimension refers to the longest chord, or diameter of the sphere. If the rollable container is a cylinder, the critical distance is the distance between the two ends of the cylinder, often referred to as the height of the cylinder. If the container is an ovoid, the critical dimension is the longest chord of the ovoid.

The first rail 306A and the second rail 306B extend a first distance to a first rollable container holder access point 308 such that the rollable containers 316-1, 316-2 are routed along the first rail and the second rail and deposited under the force of gravity into the first rollable container holder access point 308. In some implementations, the first rail 306A and the second rail 306B may terminate at the first rollable container holder access point 308. In other implementations, the spacing between the first rail 306A and the second rail 306B may increase at the first rollable container holder access point 308 such that the spacing is greater than the critical dimension of the rollable containers 316-1, 316-2. When the spacing between the first rail 306A and the second rail 306B exceeds the critical dimension of the rollable containers 316-1, 316-2, the rollable containers 316-1, 316-2 will fall between the first rail and the second rail and into the first rollable container holder access point 308.

In this example, rollable containers 318-1 and 318-2, with critical dimensions larger than the critical dimension of the rollable containers 316-1, 316-2 may also contact and roll upon the first rail 306A and the second rail 306B. In such a configuration, the separation between the first rail 306A and the second rail 306B separates so that the rollable containers 316-1, 316-2 will pass between the first rail and the second rail and into the first rollable container holder access point 308. The spacing between first rail 306A and the second rail 306B continues to separate until the spacing exceeds the critical dimension of the rollable containers 318-1, 218-2 such that the rollable containers 318-1, 318-2 will pass between the first rail 306A and the second rail 306B and into the second rollable container holder access point 310. It will be appreciated that the separation between the rails may continue to increase to facilitate transport and sorting of rollable containers having still larger critical dimensions.

The gravity feed conveyance system 300, as illustrated, also includes a third rail 304A and a fourth rail 304B aligned substantially parallel and having a second spacing between the third rail 304A and the fourth rail 304B that is greater than the critical dimension of the rollable containers 316-1, 316-2, 318-1, 318-2 and less than a critical dimension of the rollable containers 320-1 and 320-2 so that the rollable containers 320-1 and 320-2 will contact and roll upon the third rail 304A and the fourth rail 304B under the force of gravity. The third rail 304A and the fourth rail 304B extend a distance to a third rollable container holder access point 312 such that the rollable containers 320-1, 320-2 are routed along the third rail and the fourth rail and deposited under the force of gravity into the third rollable container holder access point 312. In some implementations, as illustrated, the third rail 304A and the fourth rail 304B may terminate at the third rollable container holder access point 312. In other implementations, the spacing between the third rail 304A and the fourth rail 304B may increase at the third rollable container holder access point 312 such that the spacing is greater than the critical dimension of the rollable containers 320-1, 320-2. When the spacing between the third rail 304A and the fourth rail 304B exceeds the critical dimension of the rollable containers 320-1, 320-2, the rollable containers 320-1, 320-2 will fall between the third rail and the fourth rail and into the third rollable container holder access point 312.

The gravity feed conveyance system 300, as illustrated, also includes a fifth rail 302A and a sixth rail 302B aligned substantially parallel and having a third spacing between the fifth rail 302A and the sixth rail 302B that is greater than the critical dimension of the rollable containers 320-1, 320-2 and less than a critical dimension of the rollable containers 322 so that the rollable container 322 will contact and roll upon the fifth rail 302A and the sixth rail 302B under the force of gravity. The fifth rail 302A and the sixth rail 302B extend a distance to a fourth rollable container holder access point 314 such that the rollable container 322 is routed along the fifth rail and the sixth rail and deposited under the force of gravity into the fourth rollable container holder access point 314. In some implementations, the fifth rail 302A and the sixth rail 302B may terminate at the fourth rollable container holder access point 314. In other implementations, the spacing between the fifth rail 302A and the sixth rail 302B may increase at the fourth rollable container holder access point 314 such that the spacing is greater than the critical dimension of the rollable container 322. When the spacing between the fifth rail 302A and the sixth rail 302B exceeds the critical dimension of the rollable container 322, the rollable container 322 will fall between the fifth rail and the sixth rail and into the fourth rollable container holder access point 314.

FIG. 3B illustrates a top down view 300B of the gravity feed conveyance system 300, according to an implementation. As illustrated, the pairs of rails 302A, 302B, 304A. 304B, 306A, 306B are parallel and separated a distance such that the rollable containers will contact and roll along the pairs of rails until the rails either terminate or separate causing the rollable container of that size to fall into an rollable container holder access point. Also illustrated are the rollable containers 316-1, 316-2, 318-1, 318-2, 320-1, 320-2, 322 traveling along the gravity feed conveyance system 300 under the force of gravity.

FIG. 3C illustrates a side view 300C of the gravity feed conveyance system 300, according to an implementation. As illustrated, the gravity feed conveyance system has a downward slope so that the rollable containers 316-1, 316-2, 318-1, 318-2, 320-1, 320-2, 322 will travel along the gravity feed conveyance system 300 under the force of gravity and without any human, electrical, and/or mechanical power needed. While this example illustrates that each of the pairs of rails are positioned in approximately the same plane and have the same slope, in other implementations, one or more pairs of rails may be positioned in a different plane and/or have a different slope. For example, the first rail 306A and second rail 306B (FIG. 3A) may be positioned lower than the other rails. In such a configuration, the rollable containers 316-1, 316-2 will still contact and roll along the first rail and the second rail. Likewise, if a spherical rollable container having a critical dimension that is larger than the separation between the first rail and the second rail and larger than the separation between the third rail 304A and the fourth rail 304B is used, the spherical rollable container will rest upon the third rail 304A and the fourth rail 304B and not contact the first rail 306A and second rail 306B because the first rail and the second rail are not in the same plane as the third rail and the fourth rail.

The slope of the gravity feed conveyance system 300 may be uniform throughout the materials handling facility or may vary at different locations. In one implementation, the slope of the gravity feed conveyance system may include areas that have a slope of between approximately one degree and approximately five degrees and other areas that are approximately level so that the speed of the rollable containers will decrease as they roll across the approximately level areas.

The gravity feed conveyance system 300 may include additional or fewer rails and/or other forms of conveyance that will enable the rollable containers to roll under the force of gravity. Likewise, the gravity feed conveyance system may include turns, curves, and/or variations in slope so that rollable containers may be routed to different portions of the material handling facility. Likewise, in some implementations, segments of the gravity feed conveyance system may be controlled or adjusted by the inventory management system to guide or route the rollable containers to different portions of the gravity feed conveyance system 300. For example, the gravity feed conveyance system 300 may include divert mechanisms that are controlled by the inventory management system that may be used to divert rollable containers to different sets of rails of the gravity feed conveyance system 300.

In some implementations, rather than, or in addition to sloping the rails, the gravity feed conveyance system may be configured such that the rails are adjustable in width. By adjusting the width of the rails, rollable containers may be released through the rails at different locations along the gravity feed conveyance system by separating the rails a distance that is greater than the critical dimension of the rollable container. Likewise, by separating the rails a distance that is less than the critical distance of the rollable container, the rollable container will decline further between the rails and gain speed due to the additional gravitational forces that cause the rollable container to decline as the rails are separated. In a similar manner, by narrowing the distance between the rails, the speed of the rollable container will decrease as the rollable container moves upward with the narrowing of the rails. Accordingly, the speed of the rollable containers can be altered by spreading or narrowing the separation of the rails of the gravity feed conveyance system as the rollable container moves along the rails.

FIGS. 4A-4C illustrate an example helical rollable container holder 400, according to an implementation. Specifically, FIG. 4A illustrates a side view 400A of the helical rollable container holder, FIG. 4B illustrates a top-down view 400B of the helical rollable container holder, and FIG. 4C illustrates a top-down view 400C of multiple helical rollable container holders 400-1, 400-2 . . . 400-N positioned in an inventory storage area.

The helical rollable container holder 400 may be positioned beneath a portion of the gravity feed conveyance system discussed above with respect to FIGS. 3A-3C. For example, a top of the helical rollable container holder 400 may be aligned with a rollable container holder access point 308, 310, 312, and 314 such that it will receive rollable containers as they pass through one of the access points. Likewise, the helical rollable container holder 400 may be configured to store any size, shape, and/or quantity of rollable containers 404.

In this example, the helical rollable container holder 400 includes an inner rail 402-2 and an outer rail 402-1 that are separated a distance that is less than a critical dimension of the rollable containers 404 that the helical rollable container holder 400 is configured to store. As illustrated in FIG. 4A, the inner rail 402-2 and the outer rail 402-1 begin at an inlet 410 configured to receive rollable containers 404 and are configured in a helical pattern that has any number of spirals and terminates at an outlet 408 of the helical rollable container holder. The inner rail 402-2 and the outer rail 402-1 are substantially parallel such that the separation between the inner rail 402-2 and the outer rail 402-1 does not materially change. In some implementations, the inner rail 402-2 and the outer rail 402-1 may be horizontally aligned. In other implementations, the outer rail 402-1 may be higher than the inner rail 402-2 to aid in keeping the rollable containers positioned on the helical rollable container holder 400.

Likewise, by offsetting the height of the inner rail 402-2 and the outer rail 402-1, less force is required to move or displace a rollable container 404 out of a stored position on the helical rollable container holder 400 and into the cavity formed between the rails and the other rollable containers stored on the helical rollable container holder 400. As discussed below, in some implementations, a rollable container may be picked from the helical rollable container holder 400 by moving or pushing (displacing) the rollable container 404 from an exterior of the helical rollable container holder 400 such that the rollable container enters the cavity formed in the interior of the helical rollable container holder 400. When the rollable container 404 enters the interior cavity of the helical rollable container holder, the rollable container falls, under the force of gravity, through the cavity 406 and onto a gravity feed conveyance system positioned beneath the helical rollable container holder 400.

A position identifier for each position within the helical rollable container holder 400 is defined for the helical rollable container holder. Any type of unique identifier may be utilized. As rollable containers are added to the helical rollable container holder 400, the rollable containers roll under a force of gravity to a position within the helical rollable container holder 400. When located at a position, a rollable container identifier corresponding to the rollable container is associated with the position identifier and maintained by the inventory management system.

As illustrated by the top-down view 400B of the helical rollable container holder 400, the inner rail 402-2 and the outer rail 402-1 are wound in a helical pattern such that an interior cavity 406 is formed down the interior of the helical rollable container holder 400 that is wider than the critical dimension of a rollable container 404 stored on the helical rollable container holder 400. As such, the rollable container holder has a width or critical dimension that is at least three times the critical dimension of a stored rollable container 404. In other implementations, the width or diameter of the rollable container holder 400 may be slightly less than three times the critical dimension of a stored rollable container 404. In such a configuration, when a rollable container passes through the cavity of the rollable container holder 400, it may move along other stored rollable containers, shifting between the open spaces between those rollable containers as the rollable container traverses the cavity of the rollable container holder 400.

Referring to FIG. 4C, any number of helical rollable container holders 400 may be stored together in a storage area of a materials handling facility. In some implementations, the positions of the helical rollable container holders 400 may be at fixed positions within the inventory storage area and the gravity feed conveyance system may be positioned to add and/or remove rollable containers from any one or more of the helical rollable container holders 400. For example, the gravity feed conveyance system may be positioned above each of the helical rollable container holders 400 and configured to sort rollable containers of an appropriate size into an inlet 410 of the helical rollable container holder 400 such that the rollable container contacts the inner rail 402-2 and outer rail 402-1 of a helical rollable container holder and rolls to a position within the helical rollable container holder 400.

Likewise, the gravity feed conveyance system may be positioned beneath each of the helical rollable container holders 400 and configured to receive a rollable container that is picked or released from the helical rollable container holder 400. For example, the gravity feed conveyance system may be positioned beneath the inner cavity 406 of each of the helical rollable container holders 400 and configured to receive a rollable container that passes through the cavity 406. Alternatively, or in addition thereto, the gravity feed conveyance system may be positioned at an outlet 408 of each helical rollable container holder and configured to receive a rollable container that is released through the outlet of the helical rollable container holder 400.

In other implementations, the helical rollable container holders 400-1, 400-2-400-N may be portable such that an agent (human and/or robotic unit) can move the helical rollable container holders 400 and any rollable containers stored thereon.

Figure 5:
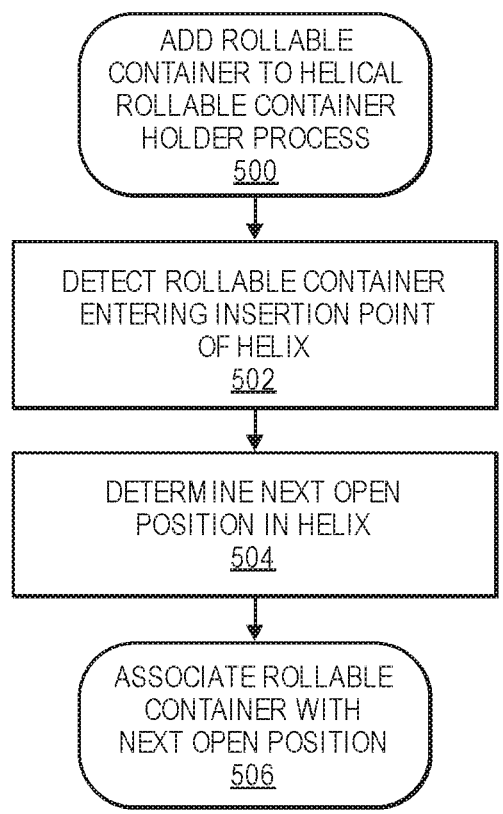
FIG. 5 is a flow diagram illustrating an example process for adding a rollable container to a helical rollable container holder, according to an implementation.

FIG. 5 is a flow diagram illustrating an example process 500 for adding rollable containers to a helical rollable container holder, according to an implementation. The process is illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation, and any number of the described operations can be combined in any order and/or in parallel to implement the process. Likewise, additional or fewer operations than those described may be utilized with the various implementations described herein.

The example process 500 begins by detecting a rollable container at an insertion point of the helical rollable container, as in 502. As discussed above, each rollable container may include a rollable container identifier that uniquely identifies the rollable container. A presence detection sensor, pressure sensor, RFID reader, barcode reader, bokode reader, QR code reader, a color detection sensor, and/or any other form of device may be positioned at or near the insertion point of the helical rollable container holder that detects the presence of the rollable container entering the helical rollable container holder.

Upon detection of a rollable container at an insertion point of the helical rollable container holder, a next open position within the helical rollable container holder is determined, as in 504. As discussed above, due to the helical design of the helical rollable container holder, rollable containers inserted into the helical rollable container holder will roll, under the force of gravity, down the helix until they reach the end of the helical rollable container holder or they contact and come to rest against another rollable container stored within the helical rollable container holder. Accordingly, as rollable containers are added to the helical rollable container holder, the position can be incremented each time and the next open position is associated with the rollable container detected at the insertion point of the helical rollable container holder, as in 506. In some implementations, the association between the rollable container and the inventory position within the helical rollable container holder may be maintained in a data store by the inventory management system. For example, the inventory management system may associate the rollable container identifier of the detected rollable container with the position identifier corresponding to the next open position within the helical rollable container holder and store that association in the data store.

Figure 6:
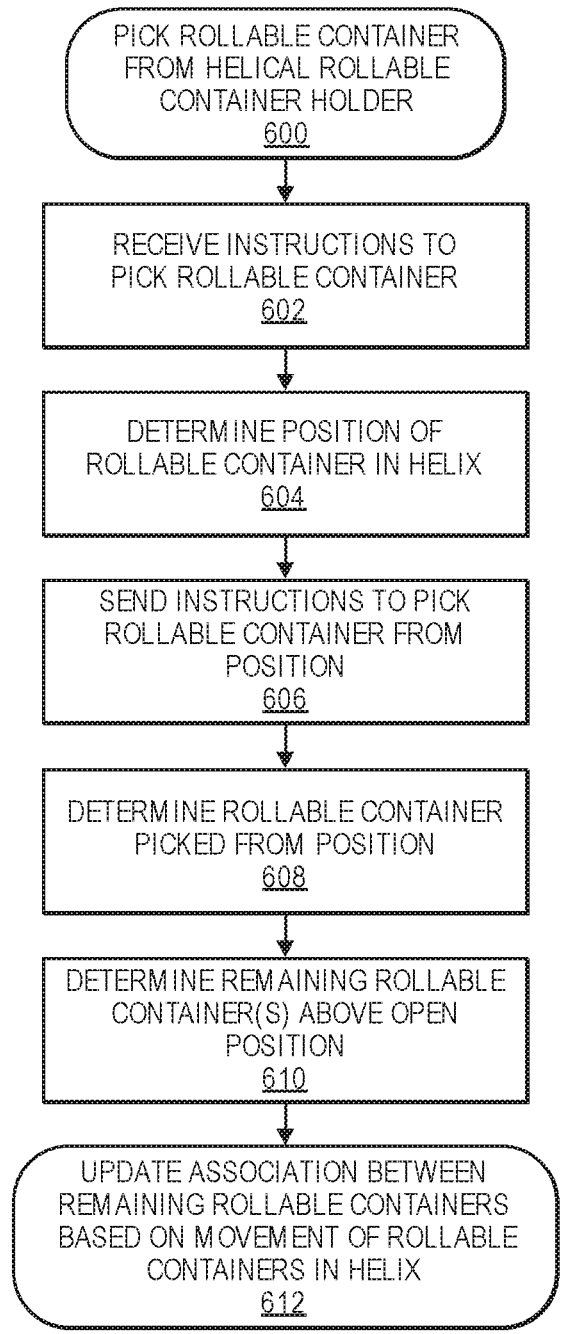
FIG. 6 is a flow diagram illustrating an example process for picking a rollable container from a helical rollable container holder, according to an implementation.

FIG. 6 is a flow diagram illustrating an example process 600 for picking a rollable container from a helical rollable container holder, according to an implementation. The example process begins by receiving instructions to pick a rollable container, as in 602. For example, if an order is received that includes an order for an item contained in a rollable container, a pick instruction is generated to pick the rollable container that includes the ordered item. The pick instruction may include a rollable container identifier corresponding to the rollable container to be picked.

Upon receiving the pick instruction, the position of the rollable container within the helical rollable container holder is determined, as in 604. As discussed above, an association between position identifier and rollable container identifier may be maintained in a data store by the inventory management system. Accordingly, the inventory management system may query the data store to determine the position of the rollable container that includes the ordered item.

Based on the determined position of the rollable container, instructions are sent to pick the rollable container from the position within the helical rollable container holder, as in 606. If the position of the rollable container is at a first position, (i.e., a position at the bottom of the helical rollable container holder), the pick may include the helical rollable container holder releasing the rollable container from the first position. In comparison, if the rollable container to be picked is at another position within the helical rollable container holder, an agent (e.g., human and/or robotic unit) may position itself adjacent the position of the rollable container and pick the rollable container from the position. Picking may include moving, pushing or otherwise displacing the rollable container from the position and into the cavity formed on the interior of the helical rollable container holder. When the rollable container enters the interior cavity, it falls down the cavity due to gravity and lands on a gravity feed conveyance system positioned below the cavity. Alternatively, a robotic unit may be positioned within the interior cavity of the helical rollable container holder and be configured to pick the item from the position and move the item onto the gravity feed conveyance system.

A determination is then made that the item has been picked, as in 608. It may be determined that the item has been picked by, for example, it being detected on the gravity feed conveyance system, no longer being able to detect a presence of a rollable container identifier, receiving a pick confirmation from an agent that picked the item, etc.

Once the rollable container has been picked, a position of rollable containers remaining in the helical rollable container holder is determined, as in 610. Because of the helical configuration of the helical rollable container holder, when a rollable container is picked from a position, all rollable containers at positions above the position from which the rollable container was picked move, under the force of gravity, to fill the position from which the rollable container was picked. For example, a helical rollable container holder may include ten positions numbered sequentially one through ten, the bottom position being identified as position one. If all positions are filled with rollable containers and the rollable container at position three is picked, the positions of the rollable containers previously at positions four through ten will move to positions three through nine, leaving position ten as an open position. Based on the determined position for the remaining rollable containers stored in the helical rollable container holder, the associations maintained between the rollable container identifiers and the position identifiers are updated, as in 612.

Figure 7B:
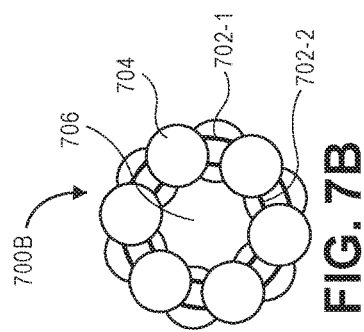
FIGS. 7A-7C illustrate an example hexagonal packed rollable container holder, according to an implementation.
Figure 7C:
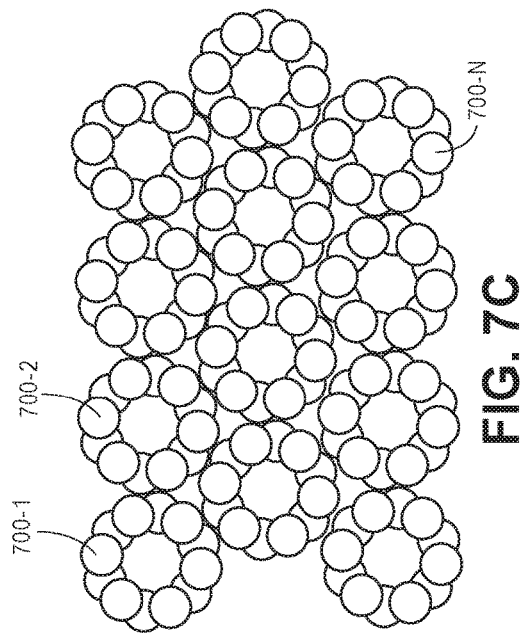
Figure 7A:
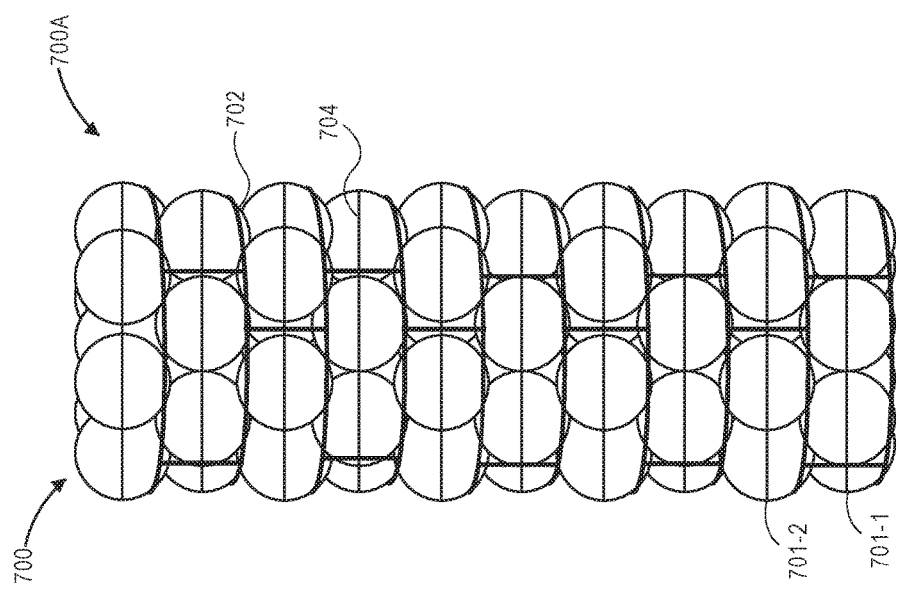

FIGS. 7A-7C illustrate an example hexagonal packed rollable container holder 700, according to an implementation. Specifically, FIG. 7A illustrates a side view 700A of the hexagonal packed rollable container holder 700, FIG. 7B illustrates a top-down view 700B of the hexagonal packed rollable container holder 700, and FIG. 7C illustrates a top-down view of multiple hexagonal packed rollable container holders 700-1, 700-2 . . . 700-N positioned in an inventory storage area.

The hexagonal packed rollable container holder 700 may be positioned beneath the gravity feed conveyance system discussed above with respect to FIGS. 3A-3C. For example, a top of the hexagonal packed rollable container holder 700 may be aligned with a rollable container holder access point 308, 310, 312, and 314 such that it will receive rollable containers as they pass through one of the access points. Likewise, the hexagonal packed rollable container holder 700 may be configured to store any size, shape, and/or quantity of rollable containers 704.

In this example, the hexagonal packed rollable container holder 700 includes a plurality of rows 701, such as row 701-1 and row 701-2 that may be used to store rollable containers. The rows may be formed of an inner rail (not shown) and an outer rail 702 that are separated a distance that is less than a critical dimension of the rollable containers 704 that the hexagonal packed rollable container holder 700 is configured to store. In some implementations, the rails 702 may be flexible to facilitate insertion and/or removal of rollable containers 704. In other implementations, all or a portion of the inner rails and/or the outer rails between rows may be separated a distance that is equal to or greater than the critical dimension of the rollable containers 704, so that rollable containers may be moved between rails of adjacent rows.

The hexagonal packed rollable container holder 700 may include any number of rows 701 for storing rollable containers. The inner rail and the outer rail 702 are substantially parallel such that the separation between the inner rail and the outer rail 702 does not materially change. In some implementations, the inner rail and the outer rail 702 may be horizontally aligned. In other implementations, the outer rail 702 may be higher than the inner rail to aid in keeping the rollable containers positioned on the hexagonal packed rollable container holder 700.

Likewise, by offsetting the height of the inner rail and the outer rail 702, less force is required to displace a rollable container 704 out of a stored position on the hexagonal packed rollable container holder 700 and into the cavity formed between the rows and the other rollable containers stored on the hexagonal packed rollable container holder 700. As discussed below, in some implementations, a rollable container may be picked from the hexagonal packed rollable container holder 700 by displacing the rollable container 704 from an exterior of the hexagonal packed rollable container holder 700 such that the rollable container enters the cavity formed in the interior of the hexagonal packed rollable container holder 700. When the rollable container enters the cavity 706, the rollable container 704 falls, under the force of gravity, through the cavity 706 and onto a gravity feed conveyance system positioned beneath the hexagonal packed rollable container holder 700.

In the illustrated configuration, each row 701 is offset by approximately one-half a critical dimension of a rollable container 704. By offsetting the positions on adjacent rows, the density of rollable containers per hexagonal packed rollable container holder 700 is increased because the rows can be positioned closer together.

Position identifiers for each position of each row within the hexagonal packed rollable container holder 700 is defined for the hexagonal packed rollable container holder. Any type of unique identifier may be utilized. As rollable containers are added to the hexagonal packed rollable container holder 700, the rollable container identifier corresponding to a rollable container is associated with the position identifier and maintained by the inventory management system.

In some implementations, the hexagonal packed rollable container holder 700 may be positioned beneath a gravity feed conveyance system such that rollable containers of a size to be stored in the hexagonal packed rollable container holder 700 exit the gravity feed conveyance system and enter the interior cavity 706 from a top of the hexagonal packed rollable container holder 700. In such a configuration, a robotic unit may be positioned within the cavity 706 and configured to receive the rollable container and divert the rollable container into an open position within the hexagonal packed rollable container holder 700.

As illustrated by the top-down view 700B of the hexagonal packed rollable container holder 700, the inner rail 702-2 and the outer rail 702-1 are configured in a hexagonal pattern such that a cavity 706 is formed down the interior of the hexagonal packed rollable container holder 700 that is wider than the critical dimension of a rollable containers 704 stored on the hexagonal packed rollable container holder 700. As illustrated, the width or diameter of the hexagonal packed rollable container holder 700 is at least three times the critical dimension of a stored rollable container 704. In other implementations, the width or diameter of the hexagonal packed rollable container holder 700 may be slightly less than three times the critical dimension of a stored rollable container 704. In such a configuration, when a rollable container passes through the cavity of the rollable container holder 700, it may move along other stored rollable containers, shifting between the open spaces between those rollable containers as the rollable container traverses the cavity of the rollable container holder 700.

Referring to FIG. 7C, any number of hexagonal packed rollable container holders 700 may be stored together in a storage area of a materials handling facility. In some implementations, the position of the hexagonal packed rollable container holders 700 may be at fixed positions within the inventory storage area and the gravity feed conveyance system may be positioned to add and/or remove rollable containers from any one or more of the hexagonal packed rollable container holders 700. For example, the gravity feed conveyance system may be positioned above each of the hexagonal packed rollable container holders 700 and configured to sort rollable containers of an appropriate size into the interior cavity 706 of the hexagonal packed rollable container holder 700. The rollable containers are received by a robotic unit positioned in the cavity 706 and diverted by the robotic unit into an open position within the hexagonal packed rollable container holder 700.

Likewise, the gravity feed conveyance system may be positioned beneath each of the hexagonal packed rollable container holders 700 and configured to receive a rollable container that is picked from the hexagonal packed rollable container holder 700. For example the gravity feed conveyance system may be positioned beneath the inner cavity 706 of each of the hexagonal packed rollable container holders 700 and configured to receive a rollable container that passes through the cavity 706.

In other implementations, the hexagonal packed rollable container holders 700-1, 700-2-700-N may be portable such that an agent (human and/or robotic unit) can move the hexagonal packed rollable container holders 700 and any rollable containers stored thereon.

FIGS. 8A-8C illustrate an example hexagonal stacked rollable container holder 800, according to an implementation. Specifically, FIG. 8A illustrates a side view 800A of the hexagonal stacked rollable container holder 800, FIG. 8B illustrates a top-down view 800B of the hexagonal stacked rollable container holder 800, and FIG. 8C illustrates a top-down view of multiple hexagonal stacked rollable container holders 800-1, 800-2 . . . 800-N positioned in an inventory storage area.

The hexagonal stacked rollable container holder 800 may be positioned beneath the gravity feed conveyance system discussed above with respect to FIGS. 3A-3C. For example, a top of the hexagonal stacked rollable container holder 800 may be aligned with a rollable container holder access point 308, 310, 312, and 314 such that it will receive rollable containers as they pass through one of the access points. Likewise, the hexagonal stacked rollable container holder 800 may be configured to store any size, shape, and/or quantity of rollable containers 804.

In this example, the hexagonal stacked rollable container holder 800 includes a plurality of rows 801, such as row 801-1 and row 801-2 that may be used to store rollable containers. The rows may be formed of an inner rail (not shown) and an outer rail 802-1 that are separated a distance that is less than a critical dimension of the rollable containers 804 that the hexagonal stacked rollable container holder 800 is configured to store.

The hexagonal stacked rollable container holder 800 may include any number of rows 801 for storing rollable containers. The inner rail and the outer rail 802 are substantially parallel such that the separation between the inner rail and the outer rail 802 does not materially change. In some implementations, the inner rail and the outer rail 802 may be horizontally aligned. In other implementations, the outer rail 802 may be higher than the inner rail to aid in keeping the rollable containers positioned on the hexagonal stacked rollable container holder.

Likewise, by offsetting the height of the inner rail and the outer rail 802, less force is required to displace a rollable container 804 out of a stored position on the hexagonal stacked rollable container holder 800) and into the cavity formed between the rows and the other rollable containers stored on the hexagonal stacked rollable container holder 800. As discussed below, in some implementations, a rollable container may be picked from the hexagonal stacked rollable container holder 800 by displacing the rollable container 804 from an exterior of the hexagonal stacked rollable container holder 800 such that the rollable container enters the cavity formed in the interior of the hexagonal stacked rollable container holder 800. When the rollable container enters the cavity 806, the rollable container 804 falls, under the force of gravity, through the cavity 806 onto a gravity feed conveyance system positioned beneath the hexagonal stacked rollable container holder 800.

In the illustrated configuration, the rows 801 of rollable containers are aligned. By aligning the rows, addressing of the positions within the hexagonal stacked rollable container holder is simplified and placing and/or picking is simplified.

Position identifiers for each position of each row within the hexagonal stacked rollable container holder 800 is defined for the hexagonal stacked rollable container holder. Any type of unique identifier may be utilized. As rollable containers are added to the hexagonal stacked rollable container holder 800, the rollable container identifier is associated with the position identifier and maintained by the inventory management system.

In some implementations, the hexagonal stacked rollable container holder 800 may be positioned beneath a gravity feed conveyance system such that rollable containers of a size to be stored in the hexagonal stacked rollable container holder 800 exit the gravity feed conveyance system and enter the interior cavity 806 from a top of the hexagonal stacked rollable container holder 800. In such a configuration, a robotic unit may be positioned within the cavity 806 and configured to receive the rollable container and divert the rollable container into an open position within the hexagonal stacked rollable container holder 800.

As illustrated by the top-down view 800B of the hexagonal stacked rollable container holder 800, the inner rail 802-2 and the outer rail 802-1 are configured in a hexagonal pattern such that an interior cavity 806 is formed along the interior of the hexagonal stacked rollable container holder 800 that is wider than the critical dimension of a rollable containers 804 stored on the hexagonal stacked rollable container holder 800. As such, a width or diameter of the hexagonal stacked rollable container holder 800 is at least three times the width of a stored rollable container 804. In other implementations, the width or diameter of the hexagonal stacked rollable container holder 800 may be slightly less than three times the critical dimension of a stored rollable container 804. In such a configuration, when a rollable container passes through the cavity of the rollable container holder 800, it may move along other stored rollable containers, shifting between the open spaces between those rollable containers as the rollable container traverses the cavity of the rollable container holder 800.

Referring to FIG. 8C, any number of hexagonal stacked rollable container holders 800 may be stored together in a storage area of a materials handling facility. In some implementations, the position of the hexagonal stacked rollable container holders 800 may be at fixed positions within the inventory storage area and the gravity feed conveyance system may be positioned to add and/or remove rollable containers from any one or more of the hexagonal stacked rollable container holders 800. For example, the gravity feed conveyance system may be positioned above each of the hexagonal stacked rollable container holders 800 and configured to sort rollable containers of an appropriate size into the interior cavity 806 of the hexagonal stacked rollable container holder 800. The rollable containers are received by a robotic unit positioned in the cavity 806 and diverted by the robotic unit into an open position within the hexagonal stacked rollable container holder 800.

Likewise, the gravity feed conveyance system may be positioned beneath each of the hexagonal stacked rollable container holders 800 and configured to receive a rollable container that is picked from the hexagonal stacked rollable container holder 800. For example the gravity feed conveyance system may be positioned beneath the inner cavity 806 of each of the hexagonal stacked rollable container holders 800 and configured to receive a rollable container that passes through the cavity 806.

In other implementations, the hexagonal stacked rollable container holders 800-1, 800-2-800-N may be portable such that an agent (human and/or robotic unit) can move the hexagonal stacked rollable container holders 800 and any rollable containers stored thereon.

Figure 9A:
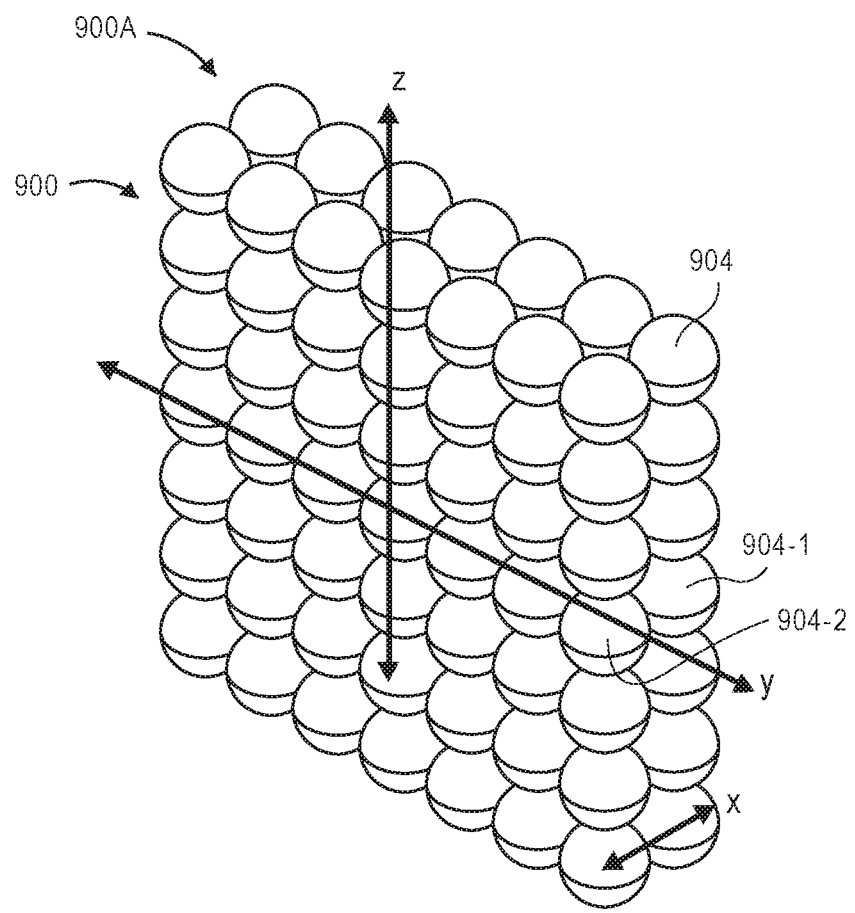
FIGS. 9A-9D illustrate an example simple cube rollable container holder, according to an implementation.
Figure 9B:
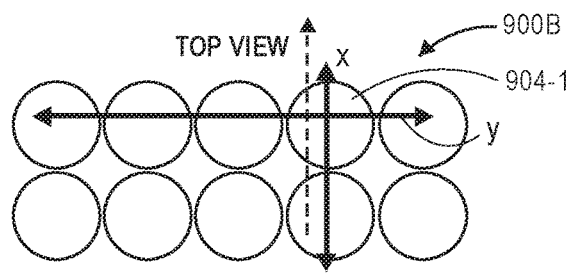
Figure 9C:
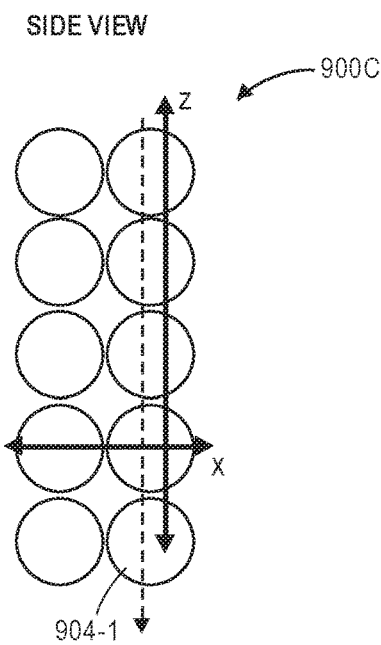
Figure 9D:
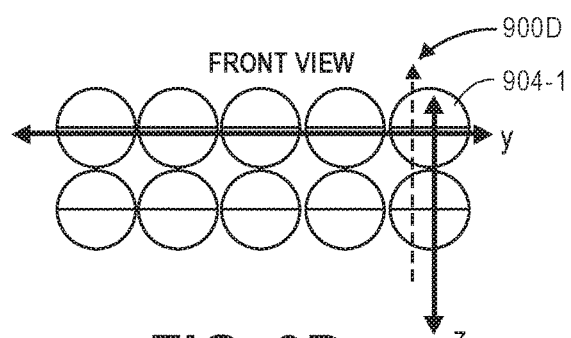

FIGS. 9A-9D illustrate an example simple cube rollable container holder 900, according to an implementation. FIG. 9A illustrates a perspective view 900A of a simple cube rollable container holder 900 that includes seven rows, seven columns, and a depth of two. FIG. 9B illustrates a top view 900B of a portion of the simple cube rollable container holder 900. FIG. 9C illustrates a side view 900C of a portion of the simple cube rollable container holder 900, and FIG. 9D illustrates a front view of a portion of the simple cube rollable container holder. The simple cube may have any number of rows, columns or depth.

For purposes of discussion, the support structure utilized to secure the rollable containers in the simple cube rollable container holder 900 is not included to facilitate explanation of the positioning and movement of the rollable containers 904. It will be appreciated that any type and configuration of support structure that maintains the rollable containers in the illustrated simple cube configuration and allows repositioning of the rollable containers in any of the X, Y, or Z direction may be utilized. For example, a series of rails positioned on either side of the rollable containers, similar to the configurations discussed above, may be utilized.

In a simple cube configuration, rollable containers 904 are stored in vertically stacked rows and columns that extend in the X direction and the Y direction, as illustrated by view 900A. Likewise, the vertically stacked rows and columns may extend in the Z direction such that multiple vertically stacked rows and columns (referred to herein as a row: column stack) are positioned adjacent one another and the rollable containers 904 are aligned in the Z direction.

By aligning the rollable containers 904 in each of the X, Y, and Z direction, a rollable container may be accessed in any X, Y, or Z direction. For example, rollable container 904-1 may be picked from the simple cube rollable container holder 900 by picking the rollable container 904-1 directly. As illustrated by the top-view 900B of FIG. 9B, rollable container 904-1 may be picked from the simple cube rollable container holder 900 by pushing or moving rollable container 904-2 back one position in the X direction, thereby moving rollable container 904-1 out of the simple cube rollable container holder 900. As illustrated in the side-view 900C of FIG. 9C, the fourth row that includes the rollable container 904-1 may be shifted in the Y direction such that the rollable container 904-1 is pushed or moved out of the simple cube rollable container holder 900. Finally, as illustrated in the front-view 900D of FIG. 9D, the column that includes the rollable container 904-1 may be moved in the Z direction such that the rollable container 904-1 is pushed or moved out of the simple cube rollable container holder 900.

While the example discusses pushing or moving a rollable container out of the simple cube rollable container holder 900 by moving one or more rollable containers in the X, Y, or Z direction, in some implementations, the rollable container 904-1 may not be pushed or moved out of the simple cube rollable container holder. Rather, the rollable container 904-1 may be pushed or moved to a position in which an agent (human and/or robotic unit) may access the rollable container and pick it from the simple cube rollable container holder 900.

Likewise, rollable containers may be re-arranged or sorted by pushing or moving different rollable containers in any one or more of the X, Y, and/or Z directions such that the rollable containers are re-sequenced into a desired order. For example, an order may include multiple items, each of which are stored in a different rollable container that is located in the rollable container holder 900. The rollable containers within the rollable container holder may be moved within the rollable container holder in the X, Y, and/or Z directions until the rollable containers that include the ordered items are adjacent one another such that they can be moved or picked from the rollable container holder 900 by an agent.

Figure 10A:
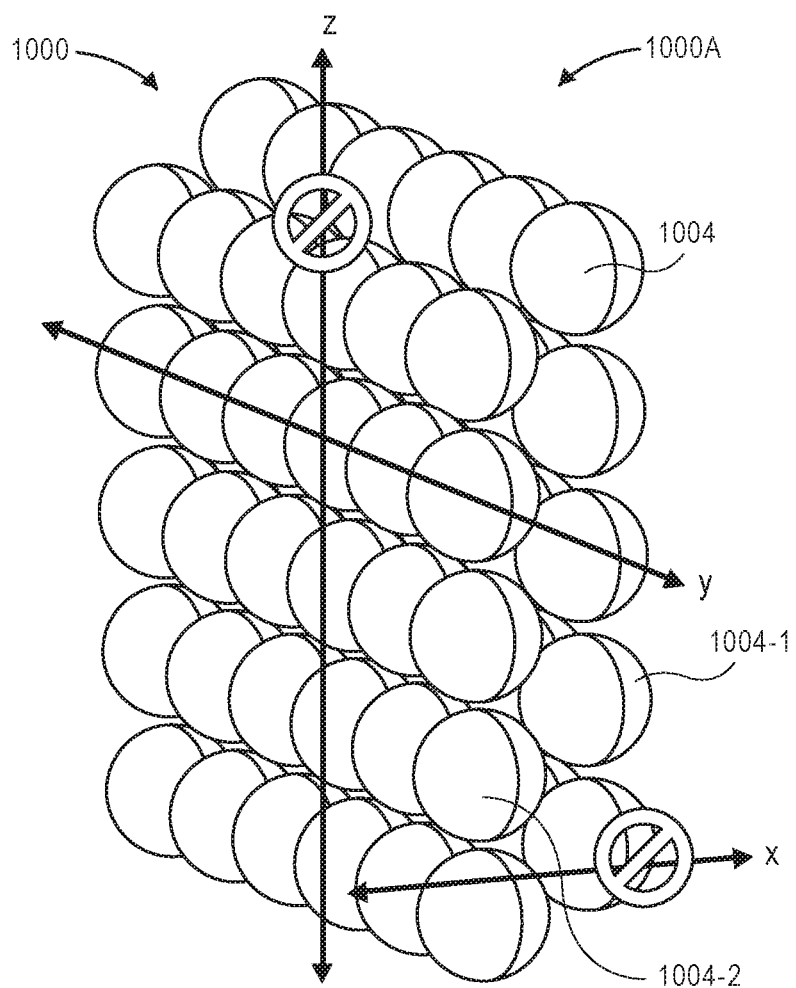
FIGS. 10A-10D illustrate an example one-dimensional offset cube rollable container holder, according to an implementation.
Figure 10B:
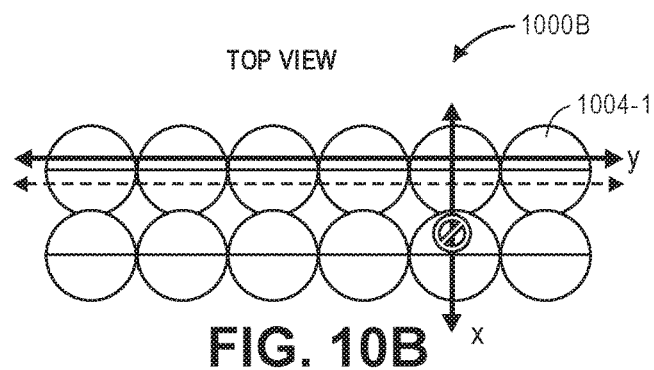
Figure 10C:
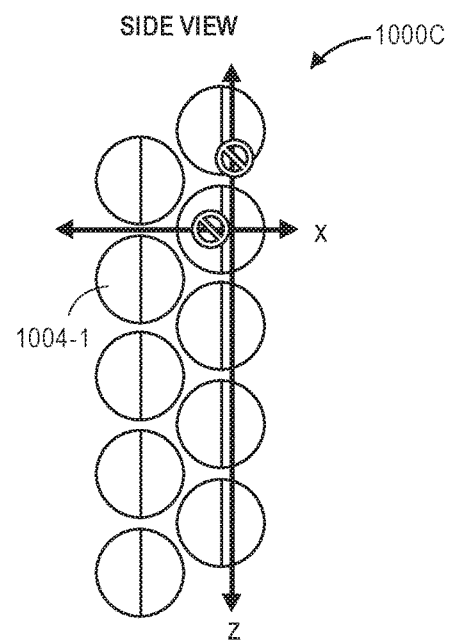
Figure 10D:
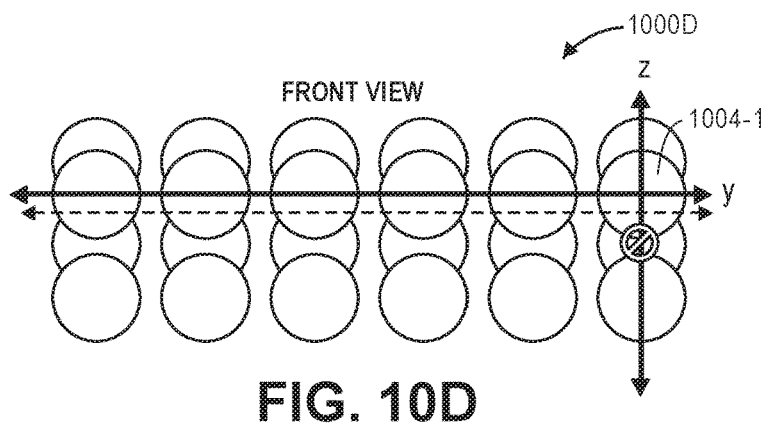

FIGS. 10A-10D illustrate an example one-dimensional offset cube rollable container holder 1000, according to an implementation. FIG. 10A illustrates a perspective view 1000A of a one-dimensional offset cube rollable container holder 1000 that includes five rows, six columns, and a depth of two. FIG. 10B illustrates a top view 1000B of a portion of the one-dimensional offset cube rollable container holder 1000. FIG. 10C illustrates a side view 1000C of a portion of the one-dimensional offset cube rollable container holder, and FIG. 10D illustrates a front view of a portion of the one-dimensional offset cube rollable container holder.

For purposes of discussion, the support structure utilized to secure the rollable containers in the one-dimensional offset cube rollable container holder 1000 is not included to facilitate explanation of the positioning and movement of the rollable containers 1004. It will be appreciated that any type and configuration of support structure that maintains the rollable containers in the illustrated one-dimensional offset cube configuration and allows repositioning of the rollable containers in the Y direction may be utilized. For example, a series of rails positioned on either side of the rollable containers, similar to the configurations discussed above, may be utilized.

In a one-dimensional offset cube configuration, rollable containers 1004 are stored in vertically stacked rows and columns that extend in the X direction and the Y direction, as illustrated by view 1000A. Likewise, the vertically stacked rows and columns may extend in the Z direction such that multiple row:column stacks are positioned adjacent one another. However, in comparison to the simple cube rollable container holder 900 (FIGS. 9A-9D), the rollable containers are offset in one-dimension and shifted in the X direction such that the row:column stacks nest between rows or columns of an adjacent stack. In this example, a row:column stack of rollable containers are offset in the Z direction and shifted in the X direction such that the rollable containers in the first row:column stack nest between rollable containers in the second row:column stack. For example, rollable container 1004-2 remains aligned with rollable container 1004-1 in the Y direction, but not the Z direction. By offsetting row:column stacks in one-dimension and nesting the row:column stacks, the storage density of the rollable containers in increased. However, accessibility of the stored rollable containers is decreased.

For example, rollable container 1004-1 may only be picked from the one-dimensional offset cube in two manners. First, the rollable container may be picked from the one-dimensional offset cube rollable container holder 1000 by picking the rollable container 1004-1 directly. Second, as illustrated in the top view 1000B of FIG. 10B, the row that includes the rollable container 1004-1 may be shifted in the Y direction such that the rollable container 1004-1 is pushed or moved out of the one-dimensional offset cube rollable container holder 1000 in the Y direction.

Referring to the side view 1000C of FIG. 10C, the rollable containers cannot be shifted in either the X direction or the Z direction because the rollable containers are not aligned in those directions due to the offset of the rollable containers in the Z direction and the shift of the rollable containers 1004 in the X direction. Finally, as illustrated in the front-view 1000D of FIG. 10D, the rollable container 1004-1 can be accessed by pushing or moving the row that includes the rollable container 1004-1 in the Y direction but cannot be accessed by pushing or moving the rollable container 1004-1 in the Z direction.

While the example discusses pushing or moving a rollable container out of the one-dimensional offset cube rollable container holder 1000 by moving one or more rollable containers in the Y direction, in some implementations, the rollable container 1004-1 may not be pushed or moved out of the one-dimensional offset cube rollable container holder 1000. Rather, the rollable container 1004-1 may be pushed or moved to a position in which an agent (human and/or robotic unit) may access the rollable container and pick it from the one-dimensional offset cube rollable container holder 1000.

Figure 11A:
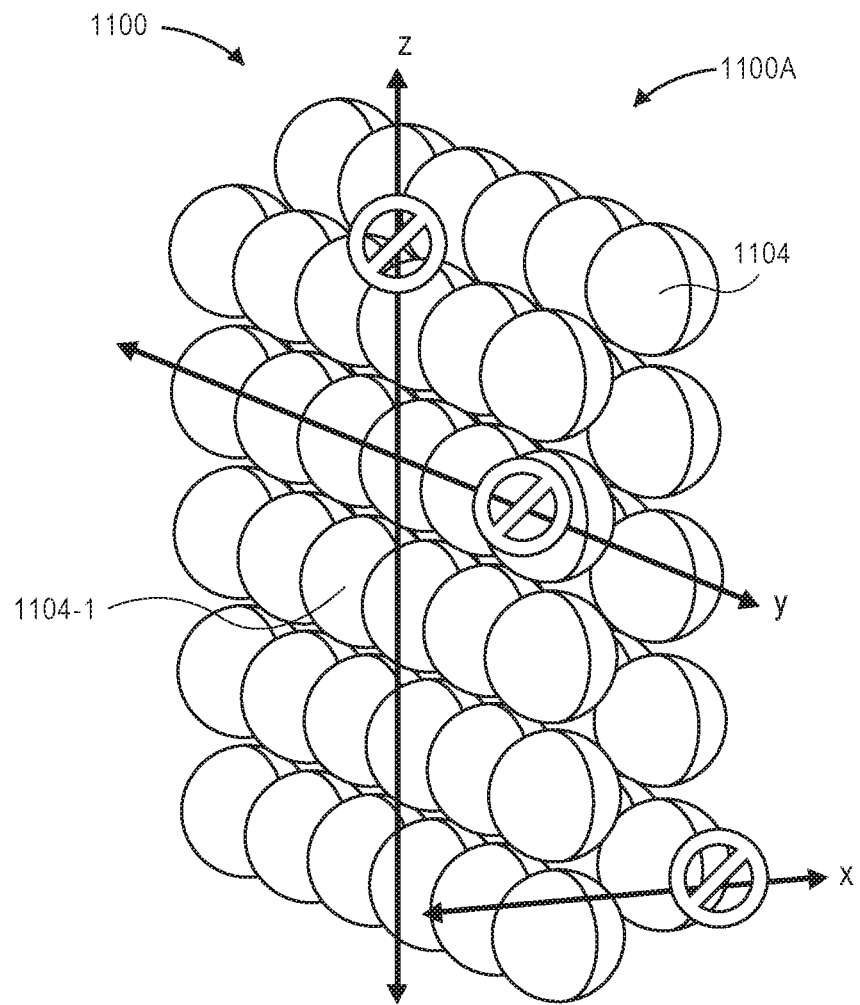
FIGS. 11A-11D illustrate an example two-dimensional offset cube rollable container holder, according to an implementation.
Figure 11B:
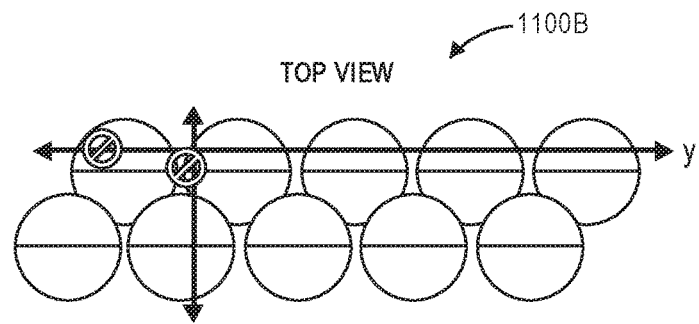
Figure 11C:
Figure 11D:
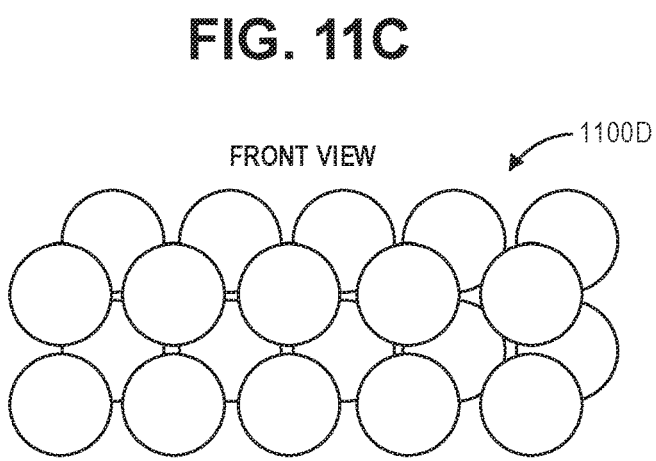

FIGS. 11A-11D illustrate an example two-dimensional offset cube rollable container holder 1100, according to an implementation. FIG. 11A illustrates a perspective view 1100A of a two-dimensional offset cube rollable container holder 1100 that includes five rows, six columns, and a depth of two. FIG. 11B illustrates a top view 1100B of a portion of the two-dimensional offset cube rollable container holder 1100. FIG. 11C illustrates a side view 1100C of a portion of the two-dimensional offset cube rollable container holder, and FIG. 11D illustrates a front view of a portion of the two-dimensional offset cube rollable container holder.

For purposes of discussion, the support structure utilized to secure the rollable containers in the two-dimensional offset cube rollable container holder 1100 is not included to facilitate explanation of the positioning and movement of the rollable containers 1104. It will be appreciated that any type and configuration of support structure that maintains the rollable containers in the illustrated two-dimensional offset cube configuration may be utilized. For example, a series of rails positioned on either side of the rollable containers, similar to the configurations discussed above, may be utilized.

In a two-dimensional offset cube configuration, rollable containers 1104 are stored in vertically stacked rows and columns that extend in the X direction and the Y direction, as illustrated by view 1100A. Likewise, the vertically stacked rows and columns may extend in the Z direction such that multiple vertically stacked rows and columns are positioned adjacent one another. However, in comparison to the simple cube rollable container holder 900 (FIGS. 9A-9D) and the one-dimensional offset cube rollable container holder 1000 (FIGS. 10A-10D), the rollable containers are offset in two-dimensions and shifted in the X direction such that they nest between rows and columns of an adjacent stack. Specifically, a row:column stack of rollable containers are offset in the Y direction and the Z direction, and shifted in the X direction such that the rollable containers in the first row:column stack nest between rollable containers in the second row:column stack in two dimensions. By offsetting row:column stacks in two-dimensions, the storage density of the rollable containers is further increased. However, accessibility of the stored rollable containers is decreased to only picking directly from a position within the two-dimensional offset cube configuration.

For example, rollable container 1104-1 may only be picked from the two-dimensional offset cube directly from the position in which it is stored. As illustrated in the views 1100B. 1100C, 1100D of FIGS. 11B, 11C, and 11D, because the rollable containers are offset in two-dimensions, the rows, columns, and/or rollable containers cannot be shifted or moved in any of the X, Y, or Z direction, other than picked directly from the position in which they are stored.

In the examples discussed above with respect to FIGS. 9A-11D, the rollable containers may be picked and/or shifted by one or more agents, such as a human and/or a robotic unit. Likewise, the robotic unit may be manually controlled and/or autonomous. In some examples, the robotic unit may include an engagement mechanism that couples with the rollable container to enable picking of the rollable container. The engagement mechanism may be, for example, an electromagnet, hook, grapple, or any other mechanism that may be used to pick a rollable container from a position.

Once picked, the rollable container may be placed at another position on the rollable container holder, or routed to another location within the materials handling facility under power of the agent. Alternatively, the agent may place a picked rollable container on a gravity feed conveyance system such that the rollable container is routed to another location along the gravity feed conveyance system by rolling along the gravity feed conveyance system under gravitational forces.

Figure 12:
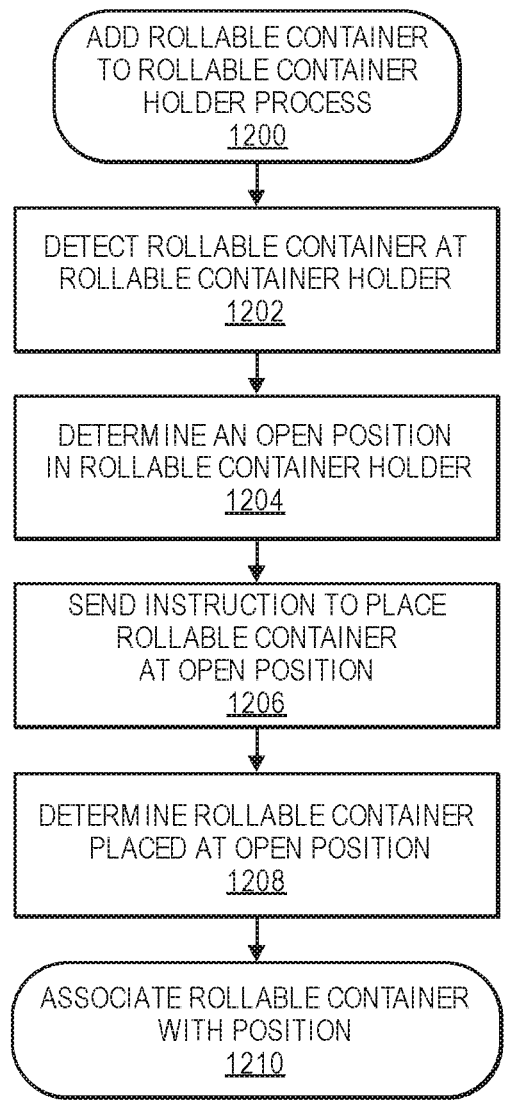
FIG. 12 is a flow diagram illustrating an example process for adding a rollable container to a rollable container holder, according to an implementation.

FIG. 12 is a flow diagram illustrating an example process 1200 for adding a rollable container to a rollable container holder, according to an implementation. The example process 1200 begins by detecting a rollable container at a rollable container holder, such as one of the rollable container holders discussed above with respect to FIGS. 9A-11D, as in 1202. As discussed above, each rollable container may include a rollable container identifier that uniquely identifies the rollable container. A presence detection sensor, pressure sensor, RFID reader, barcode reader, bokode reader, QR code reader, color detection sensor, and/or any other form of device may be positioned at or near the rollable container holder that detects the presence of the rollable container as it arrives at the rollable container holder. For example, a rollable container may travel along a gravity feed conveyance system and be routed to a rollable container holder for storage. As it approaches the rollable container holder, the rollable container identifier may be detected. In some implementations, an agent may be positioned at the rollable container holder and configured to detect the rollable container as it arrives at the rollable container holder.

Upon detection of a rollable container at a rollable container holder, an open position within the rollable container holder is determined, as in 1204. As discussed above, rollable containers may be picked and/or placed into positions within the rollable container holder and an association between the position identifier and rollable container identifiers updated and maintained by the inventory management system. If a position identifier does not include an associated rollable container identifier, the position may be determined to be an open position.

Based on the determined open position, instructions are generated and sent to an agent, such as a human and/or robotic unit, to place the rollable container at a determined open position, as in 1206. The instructions may include, for example, the rollable container identifier and a position identifier. The agent may have information indicating the physical position within the rollable container holder corresponding to the position identifier included in the instructions. In another example, the positions of the rollable container holders may be associated with physical coordinates. In such an implementation, the physical coordinates may be included in the instructions in addition to (or instead of) the position identifier.

After sending the instructions to place the rollable container at a position, it is determined that the rollable container has been placed at the position, as in 1208. For example, the agent may send a placement confirmation indicating that the rollable container has been placed at the indicated position. In another example, one or more sensors (e.g., load cells, pressure sensors, and presence detection sensors) may be located at each position within the rollable container holder and when the item is placed at the position a confirmation message may be generated and sent by the sensor. In still another example, the entire rollable container holder may be positioned on a sensor, such as a load cell, that can detect a change in a weight of the rollable container holder. When the rollable container is placed at the position, the total weight of the rollable container holder increases. Such an increase in total weight may be determinative that the rollable container has been placed at the position on the rollable container holder.

Upon determining that the rollable container has been placed at the determined position on the rollable container holder, the rollable container identifier of the rollable container is associated with the position identifier corresponding to the position at which the rollable container was placed, as in 1210. In some implementations, the association between the rollable container identifier and the position identifier is maintained in a data store by the inventory management system. When a rollable container identifier is associated with a position identifier, the position is no longer considered open.

Figure 13:
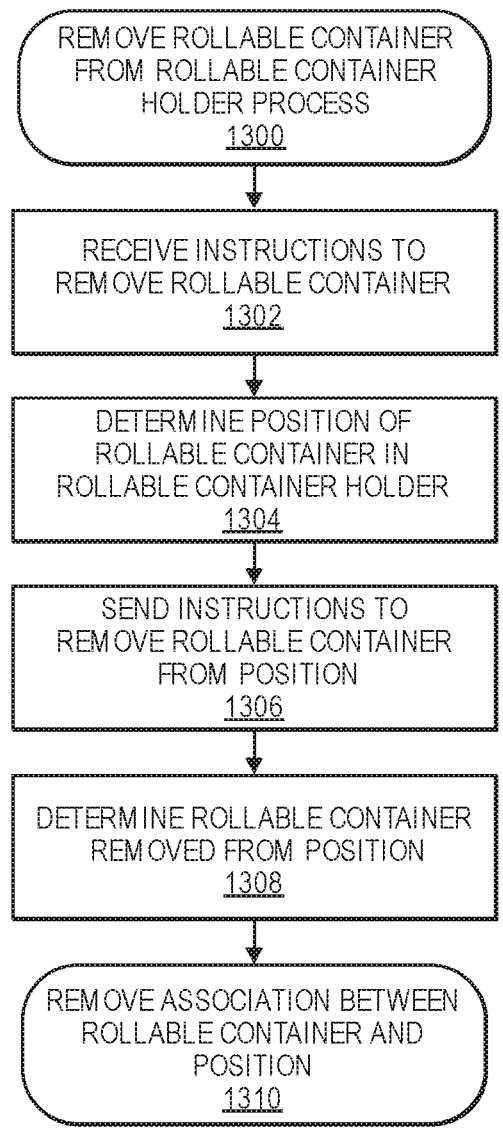
FIG. 13 is a flow diagram illustrating an example process for picking a rollable container from a rollable container holder, according to an implementation.

FIG. 13 is a flow diagram illustrating an example process 1300 for picking a rollable container from a rollable container holder, such as a rollable container holder discussed in FIGS. 9A-11D above, according to an implementation. The example process begins by receiving instructions to pick a rollable container, as in 1302. For example, if an order is received that includes an order for an item contained in a rollable container, a pick instruction is generated to pick the rollable container that includes the ordered item. The pick instruction may include a rollable container identifier corresponding to the rollable container to be picked.

Upon receiving the pick instruction, the position of the rollable container within a rollable container holder is determined, as in 1304. As discussed above, an association between a position identifier and a rollable container identifier may be maintained in a data store by the inventory management system. Accordingly, the inventory management system may query the data store to determine the position of the rollable container that includes the ordered item.

Based on the determined position of the rollable container, instructions are sent to pick the rollable container from the position within the rollable container holder, as in 1306. The pick instructions may be sent to an agent (e.g., human and/or robotic unit) that positions itself adjacent the position of the rollable container and picks the rollable container from the position, according to the pick instructions. Picking may include directly picking the rollable container from the position or shifting one or more rows and/or columns of rollable containers so that the rollable container to be picked is moved out of the rollable container holder or moved to a position at which it can be picked by the agent.

As discussed above, prior to and/or as part of a picking operation, the rollable containers may be re-arranged or re-sequenced within the rollable container holder. For example, different rollable containers within the rollable container holder may be moved or shifted until a sequence of rollable containers has been established according to the instructions.

Returning to FIG. 13, a determination is then made that the rollable container has been picked, as in 1308. It may be determined that the rollable container has been picked by, for example, it being detected on the gravity feed conveyance systems, no longer being able to detect a presence of a rollable container identifier, receiving a pick confirmation from an agent that picked the item, etc. In some implementations, in a manner similar to determining that an item has been placed at a position, one or more sensors at the position and/or that monitors a total weight of the rollable container holder, may provide an indication that the item has been picked when the weight changes due to the removal of the item.

Once the rollable container has been picked, an association between the position from which the rollable container was picked and the rollable container is removed such that the position is indicated as an open position into which another rollable container may be placed, as in 1310.

Figure 14A:
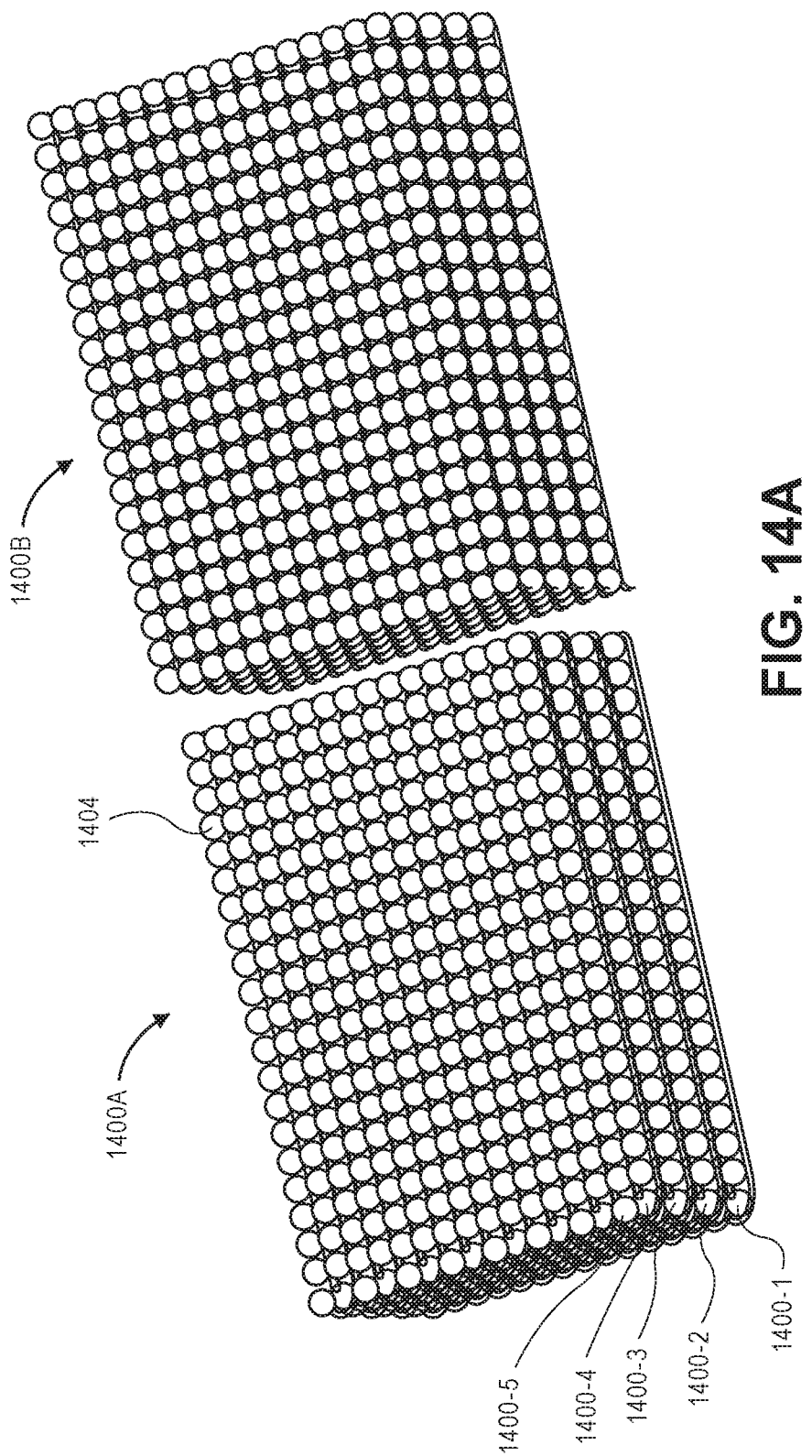
FIG. 14A illustrates a horizontal grid rollable container holder, according to an implementation.

FIG. 14A illustrates horizontal grid rollable container holders 1400A and 1400B, according to an implementation. In this example, the horizontal grid rollable container holders 1400A, 1400B are configured of multiple sets of horizontally paired rows of rollable container holders. For example, FIG. 14B provides an exploded view 1406 of an end of two rows 1408, 1409 in which the inner rail 1402-2 and the outer rail 1402-1 curve and connect with the rails of the horizontally adjacent row. In this manner, the rollable containers 1404 may be moved in either direction along the rails 1402-1, 1402-2. When a horizontal container reaches the end of a row 1408 it will roll along the curved rails and into the horizontally adjacent row 1409.

In some implementations, an agent 1410, such as a robotic unit, may include a conveyance mechanism 1412 that may be positioned at ends of each horizontally attached pair of rows 1408, 1409. The agent 1410 may move the rollable containers between rows by pushing a rollable container into one row, such as row 1408, which causes a rollable container to be pushed out of the adjacent row 1409 and into the conveyance mechanism 1412. The rollable container that is pushed into the conveyance mechanism 1412 may then be routed through the conveyance mechanism 1412 and pushed into the first row 1408, causing another rollable container to exit the end of the row 1409 into the conveyance mechanism. This process may continue until the rollable container to be picked is pushed out of a row 1409 and into the conveyance mechanism 1412.

As will be appreciated, the conveyance mechanism 1412 and/or another agent may move rollable containers in either direction between rows. Likewise, while this example shows a pair of rows connected by curved end rails, in some implementations multiple rows (e.g., 3 or more) may be connected such that when a rollable container is pushed into the end of one row, the rollable containers of the connected rows shift. In such a configuration, the curved ends are placed on opposing ends of each pair of rows so that the connected rows form an S like pattern, thereby allowing the rollable containers to move between rows. In still another example, rather than connecting adjacent horizontal rows, in some implementations, adjacent vertical rows may be connected such that rollable containers may be moved between vertical rows.

Returning to FIG. 14A, the horizontal grid rollable container holders 1400A and 1400B may include any number and combination of coupled rows that are configured to store rollable containers. In this example, the horizontal grid rollable container holder 1400A includes five rows 1400-1, 1400-2, 1400-3, 1400-4, and 1400-5 of rollable container holders, and several columns, thus forming the illustrated grid. In other implementations, the horizontal grid rollable container holders 1400A and/or 1400B may include additional and/or fewer rows and/or columns of rollable container holders.

Likewise, in some implementations, rather than the ends of adjacent rows coupled with curved rails such that the rollable containers may be pushed into and exit the rows from a same end, as illustrated in FIG. 14B, the rows between the horizontal grid rollable container holder 1400A and 1400B may be coupled such that the rollable containers can be moved between grids.

Figure 15:
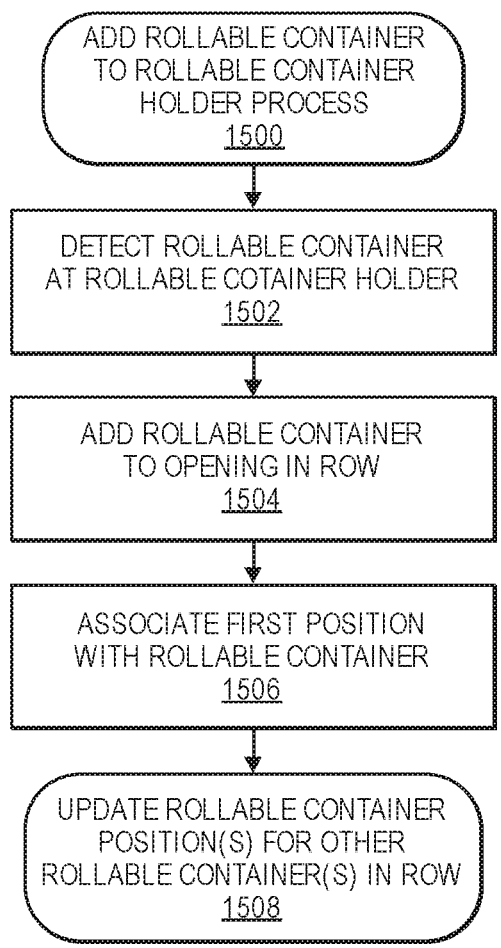
FIG. 15 is a flow diagram illustrating an example process for adding a rollable container to a horizontal grid rollable container holder, according to an implementation.

FIG. 15 is a flow diagram illustrating an example process for adding a rollable container to a horizontal grid rollable container holder, according to an implementation. The example process 1500 begins by detecting a rollable container at a rollable container holder, such as one of the rollable container holders discussed above with respect to FIGS. 14A-14B, as in 1502. As discussed above, each rollable container may include a rollable container identifier that uniquely identifies the rollable container. A presence detection sensor, pressure sensor, RFID reader, barcode reader, bokode reader, QR code reader, color detection sensor, and/or any other form of device may be positioned at or near the rollable container holder that detects the presence of the rollable container as it arrives at the rollable container holder. For example, a rollable container may travel along a gravity feed conveyance system and be routed to a rollable container holder for storage. As it approaches the rollable container holder, the rollable container identifier may be detected. In some implementations, an agent may be positioned at the rollable container holder and be configured to detect the rollable container as it arrives at the rollable container holder.

Upon detection of a rollable container at a rollable container holder, the rollable container is inserted into the open end of the row in the rollable container holder, as in 1504. As discussed above, an agent may include a conveyance mechanism that can be used to insert a rollable container into an open end of a row within the rollable container holder. In other implementations, any form of agent (human and/or robotic) may be used to insert the detected rollable container into the open end of the row of the rollable container holder.

Upon insertion of the rollable container into the open end of the rollable container holder, the rollable container identifier corresponding to the inserted rollable container is associated with the first position of the row into which it was inserted, as in 1506. In some implementations, the association between the rollable container identifier and the position identifier corresponding to the first position of the row is maintained in a data store by the inventory management system.

In addition to associating the rollable container identifier with the position identifier corresponding to the first position in the row, the associations between rollable container identifiers corresponding to rollable containers stored in the row, or a connected row, are updated to correspond to the next adjacent position to which they have been moved, as in 1508. As discussed above, when a rollable container is inserted into an open end of a row, the other rollable containers already stored in the row, or a connected row, are moved one position due to the insertion of the rollable container. Accordingly, the association between the position identifier and the rollable container identifiers for each rollable container stored in the row or a connected row is updated to correspond to the new position of the rollable container(s).

Figure 16:
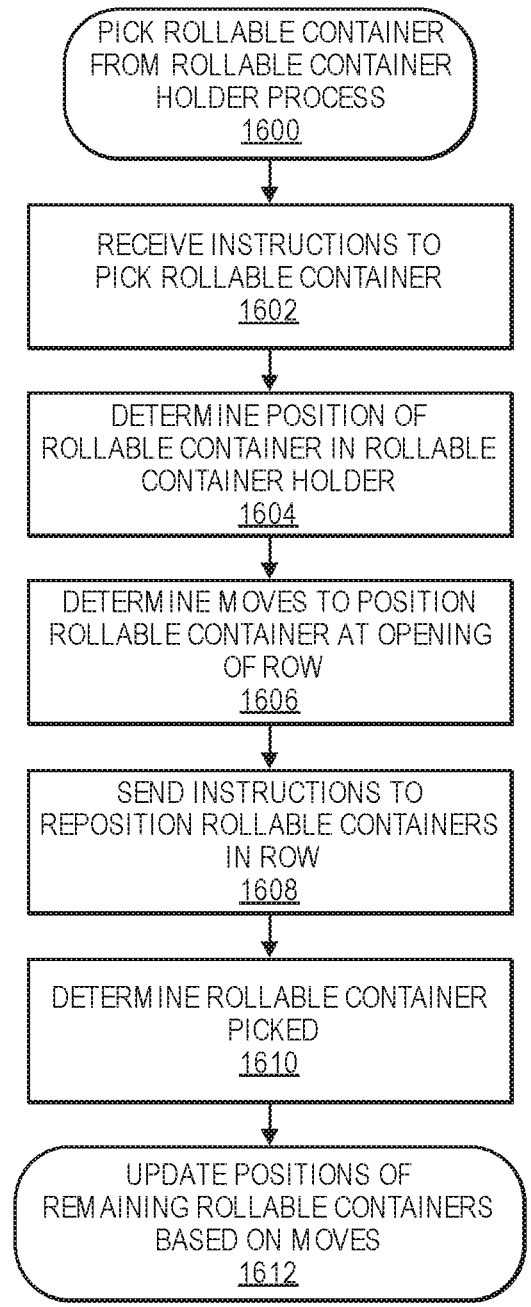
FIG. 16 is a flow diagram illustrating an example process for picking a rollable container from a horizontal grid rollable container holder, according to an implementation.

FIG. 16 is a flow diagram illustrating an example process 1600 for picking a rollable container from a rollable container holder, such as a rollable container holder discussed in FIGS. 14A-14B above, according to an implementation. The example process begins by receiving instructions to pick a rollable container, as in 1602. For example, if an order is received that includes an order for an item contained in a rollable container, a pick instruction is generated to pick the rollable container that includes the ordered item. The pick instruction may include a rollable container identifier corresponding to the rollable container to be picked.

Upon receiving the pick instruction, the position of the rollable container within a rollable container holder is determined, as in 1604. As discussed above, an association between a position identifier and a rollable container identifier may be maintained in a data store by the inventory management system. Accordingly, the inventory management system may query the data store to determine the position of the rollable container that includes the ordered item.

Based on the determined position of the rollable container, a determination is made as to the number of moves needed to reposition the rollable container such that the rollable container to be picked is at the end of a row or pushed out of the end of a row, as in 1606. For example, as discussed above with respect to FIG. 14B, rollable containers may be pushed into an open end of one row, which cause the rollable containers stored in the row, and the connected adjacent row to shift, pushing another rollable container out of the end of the adjacent row. Based on the known position of the rollable container to be picked, it may be determined into which row, rollable containers are to be inserted and the number of rollable containers to be inserted such that the rollable container to be picked reaches the end of a row, or is pushed out of the end of a row.

Based on the position of the rollable container and the determined number of moves, pick instructions are sent that cause the rollable container to be picked from the rollable container holder, as in 1608. The pick instructions may be sent to an agent (e.g., human and/or robotic unit) that positions itself adjacent the open ends of a pair of rows that are connected at an opposing end, according to the pick instructions. Picking may include the agent inserting a first rollable container into an open end of a row such that the rollable container stored in that row and the connected rows shift, causing a rollable container to exit the adjacent, connected row. The rollable container that exits the adjacent, connected row may be received by the agent and used as the next rollable container inserted into the row. This process of inserting a rollable container into one row to cause the stored rollable containers to shift and push a rollable container out of an adjacent row continues for the corresponding number of moves indicated in the pick instructions until the rollable container to be picked is pushed out of the end of a row.

A determination is then made that the rollable container has been picked, as in 1610. It may be determined that the rollable container has been picked by, for example, it being detected on the gravity feed conveyance systems, no longer being able to detect a presence of a rollable container identifier, receiving a pick confirmation from an agent that picked the rollable container, etc. In some implementations, one or more sensors at the exit or opening of a row may detect the rollable container identifier as it is pushed out of the row to the agent, thereby indicating that the rollable container has been picked.

Upon determining that the rollable container has been picked, a position of each of the rollable containers that remain in the rollable container holder and stored on the rows in which rollable containers were moved is updated, as in 1612. For example, if three moves of pushing a rollable container into the end of a row were performed, an association between the rollable container identifiers and position identifiers is updated such that the new position of each rollable container corresponds with the position identifier of the position at which the rollable container is now positioned—which, in this example, will be three positions from where it was previously stored.

Figure 17B:
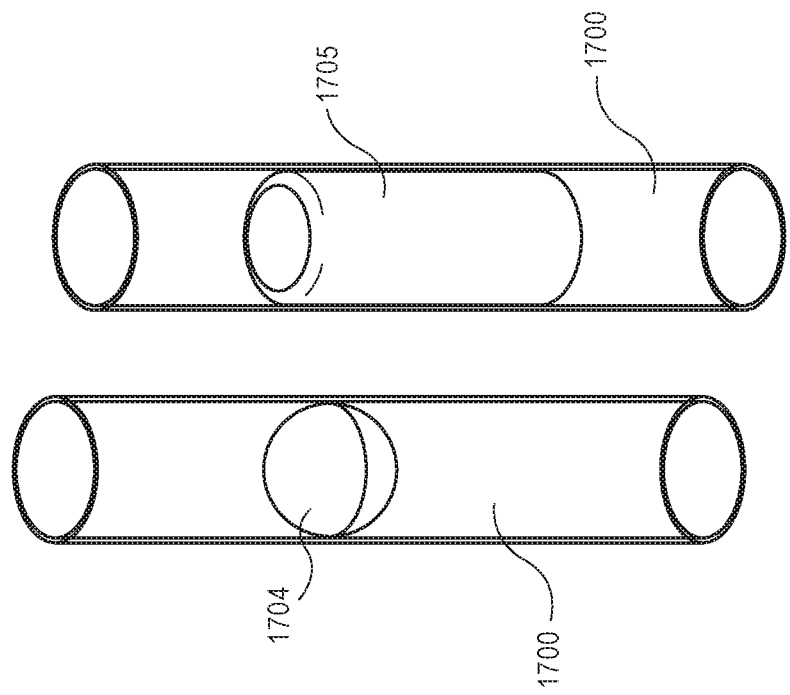
FIGS. 17A-17B illustrate example configurations for transporting a rollable container, according to an implementation.
Figure 17A:
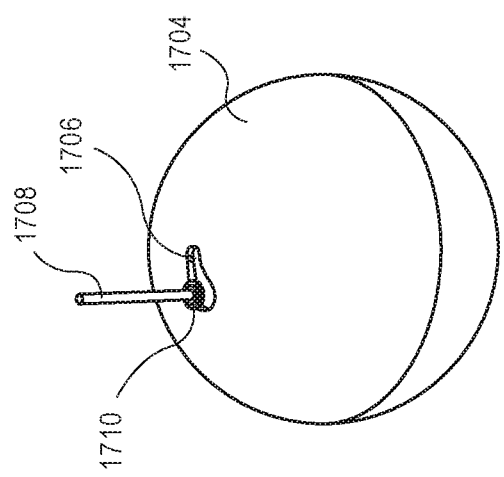

FIGS. 17A-17B illustrate example configurations for transporting a rollable container, according to an implementation. As discussed above, the rollable container 1704 may include one or more engagement locations 1706 that may be engaged by an engagement mechanism 1708. In the example illustrated in FIG. 17A, the engagement location 1706 is an opening in an exterior surface of the rollable container 1704 and the engagement mechanism 1708 includes a larger surface area 1710 that will fit within the opening and engage the rollable container. In such a configuration, the rollable container may be lifted, picked, and/or otherwise moved by an agent (human and/or robotic) that is coupled to or otherwise controls the engagement mechanism 1708.

FIG. 17B illustrates another example in which the rollable containers 1704, 1705, when not moving under the force of gravity, may be moved pneumatically using air pressure, according to an implementation. In this example, the rollable containers 1704, 1705 may be positioned within pneumatic conveyance tubes 1700 that utilize air pressure differentials to convey the rollable containers within the pneumatic conveyance tubes 1700 to different locations within the materials handling facility.

In other implementations, other forms and/or types of engagement and/or conveyance may be utilized to engage and/or move the rollable containers when they are not moving as a result of gravity. For example, the engagement mechanism may be configured to clasp, grab, push, lift, scoop, etc., a rollable container. In other implementations, if the rollable container 1704 includes a smooth surface, the engagement mechanism may be configured to be secured to the exterior of the rollable container by forming a vacuum (suction) between the exterior surface of the rollable container 1704 and the engagement mechanism. In another example, some or all of the exterior surface of the rollable container 1704 may be formed of a metallic and/or magnetic material. The engagement mechanism may include an electromagnet that when charged attracts the metallic and/or magnetic surface, thereby enabling the engagement mechanism to couple with the rollable container. As will be appreciated, any variety of engagement mechanism or conveyance mechanism may be utilized to couple with and/or move rollable containers.

Figure 18:
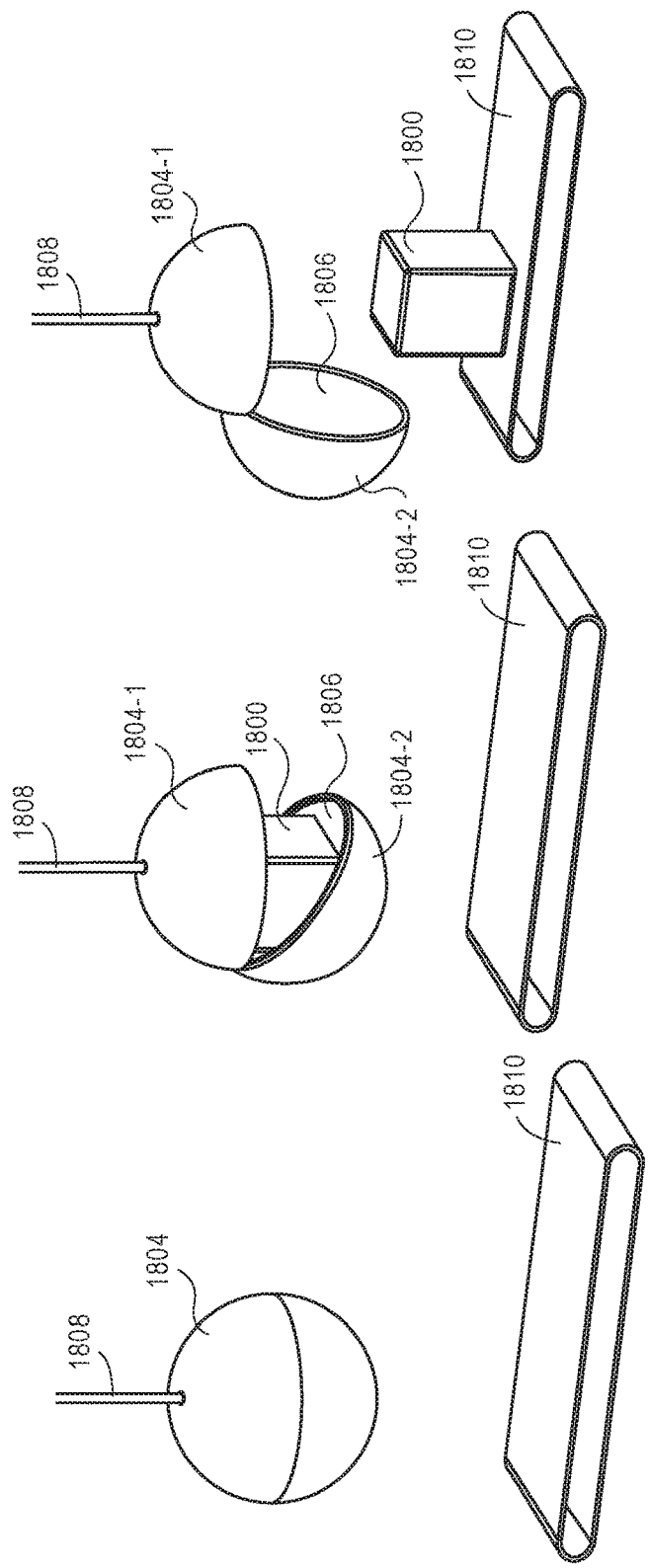
FIG. 18 illustrates an example transition diagram for removing an inventory item from a rollable container, according to an implementation.

FIG. 18 illustrates an example transition diagram for removing an item 1800 from a rollable container 1804, according to an implementation. In this example, the rollable container 1804 is engaged by an engagement mechanism 1808 and positioned above a conveyor 1810. When the rollable container is in position, the rollable container opens so that the item 1800 will come out of the interior of the rollable container 1804 and become positioned on the conveyor 1810.

In this example, the rollable container 1804 includes an upper portion 1804-1 and a lower portion 1804-2 that are joined by a hinge. The rollable container is opened by the lower portion 1804-2 rotating about the hinge such that the upper portion 1804-1 and the lower portion 1804-2 of the rollable container 1804 separate, exposing the interior 1806 of the rollable container. Likewise, by positioning the rollable container above the conveyor 1810, as the lower portion 1804-2 is opened, the item 1800 will exit the interior 1806 of the rollable container 1804 under the force of gravity and come to rest on the conveyor 1810.

As discussed above, the upper portion 1804-14 and the lower portion 1804-2 may be secured in a closed position using hooks, magnets, etc. In one implementation, if the upper portion 1804-1 and the lower portion 1804-2 are secured in a closed position using magnets, an electromagnet may be introduced that counteracts the attraction of the magnets that secure the upper portion 1804-1 and the lower portion 1804-2, thereby causing the lower portion 1804-2 to separate from the upper portion 1804-1. In other implementations, other forms of release, such as activating a latch, unscrewing the two sections of the rollable container, etc., may be utilized and the example provided in FIG. 18 is for illustration purposes only.

When an item is removed from the rollable container, it may be further processed and/or packaged. For example, the conveyor 1810 may move the item 1800 to a packing station so that it can be packed with other ordered items for shipment to a customer. In another example, the conveyor 1810 may move the item directly to shipping so that it can be loaded onto a transportation unit and transported to another location.

Various operations of an inventory management system, such as those described herein, may be executed on one or more computer systems, interacting with various other devices in a materials handling facility, according to various implementations. One such computer system is illustrated by the block diagram in FIG. 19. In the illustrated implementation, a computer system 1900 includes one or more processors 1910A, 1910B through 1910N, coupled to a non-transitory computer-readable storage medium 1920 via an input/output (I/O) interface 1930. The computer system 1900 further includes a network interface 1940 coupled to the I/O interface 1930, and one or more input/output devices 1950. In some implementations, it is contemplated that a described implementation may be implemented using a single instance of the computer system 1900 while, in other implementations, multiple such systems or multiple nodes making up the computer system 1900 may be configured to host different portions or instances of the described implementations. For example, in one implementation, some data sources or services (e.g., routing, pick instructions) may be implemented via one or more nodes of the computer system 1900 that are distinct from those nodes implementing other data sources or services.

In various implementations, the computer system 1900 may be a uniprocessor system including one processor 1910A, or a multiprocessor system including several processors 1910A-1910N (e.g., two, four, eight, or another suitable number). The processors 1910A-1910N may be any suitable processor capable of executing instructions. For example, in various implementations, the processors 1910A-1910N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1910A-1910N may commonly, but not necessarily, implement the same ISA.

The non-transitory computer-readable storage medium 1920 may be configured to store executable instructions and/or data accessible by the one or more processors 1910A-1910N. In various implementations, the non-transitory computer-readable storage medium 1920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1920 as program instructions 1925 and data storage 1935, respectively. In other implementations, program instructions and/or data may be received, sent or stored upon different types of computer-accessible media, such as non-transitory media, or on similar media separate from the non-transitory computer-readable storage medium 1920 or the computer system 1900. Generally speaking, a non-transitory, computer-readable storage medium may include storage media or memory media such as magnetic or optical media. e.g., disk or CD/DVD-ROM coupled to the computer system 1900 via the I/O interface 1930. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1940.

In one implementation, the I/O interface 1930 may be configured to coordinate I/O traffic between the processors 1910A-1910N, the non-transitory computer-readable storage medium 1920, and any peripheral devices, including the network interface 1940 or other peripheral interfaces, such as input/output devices 1950. In some implementations, the I/O interface 1930 may perform any) necessary protocol, timing or other data transformations to convert data signals from one component (e.g., non-transitory computer-readable storage medium 1920) into a format suitable for use by another component (e.g., processors 1910A-1910N). In some implementations, the I/O interface 1930 may include support for devices attached through various types of peripheral buses, such as a variant of the Peripheral Component Interconnect (PCI) bus standard or the Universal Serial Bus (USB) standard, for example. In some implementations, the function of the I/O interface 1930 may be split into two or more separate components, such as a north bridge and a south bridge, for example. Also, in some implementations, some or all of the functionality of the I/O interface 1930, such as an interface to the non-transitory computer-readable storage medium 1920, may be incorporated directly into the processors 1910A-1910N.

The network interface 1940 may be configured to allow data to be exchanged between the computer system 1900 and other devices attached to a network, such as other computer systems, or between nodes of the computer system 1900. In various implementations, the network interface 1940 may support communication via wired or wireless general data networks, such as any suitable type of Ethernet network.

Input/output devices 1950 may, in some implementations, include one or more displays, projection devices, audio output devices, keyboards, keypads, touchpads, scanning devices, voice or optical recognition devices, or any other devices suitable for entering or retrieving data by one or more computer systems 1900. Multiple input/output devices 1950 may be present in the computer system 1900 or may be distributed on various nodes of the computer system 1900. In some implementations, similar input/output devices may be separate from the computer system 1900 and may interact with one or more nodes of the computer system 1900 through a wired or wireless connection, such as over the network interface 1940.

Figure 19:
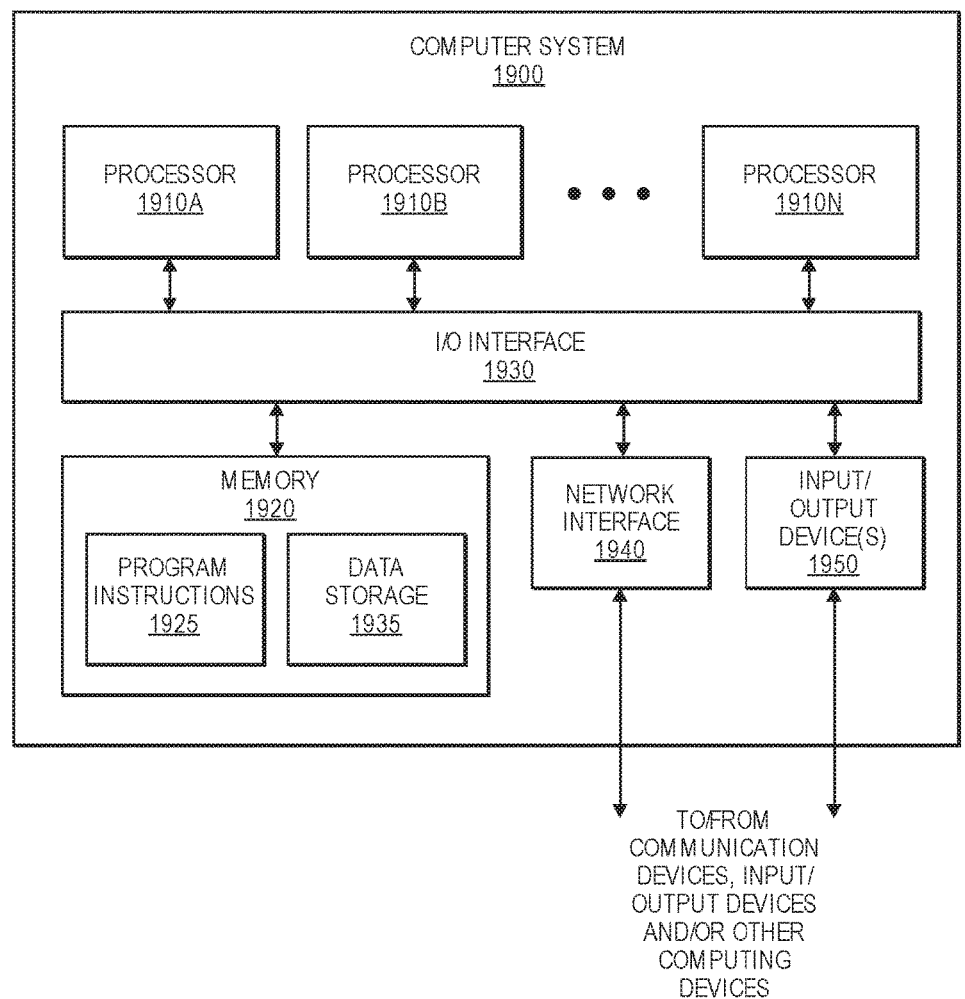
FIG. 19 is a block diagram illustrating an example computer system, according to an implementation.

As shown in FIG. 19, the memory 1920 may include program instructions 1925 that may be configured to implement one or more of the described implementations and/or provide data storage 1935, which may comprise various tables, data stores and/or other data structures accessible by the program instructions 1925. The data storage 1935 may include various data stores for maintaining one or more item lists, data representing physical characteristics of items and/or other item parameter values, rollable container dimensions, rollable container identifiers, inventory position identifiers within rollable container holders, etc. The data storage 1935 may also include one or more data stores for maintaining data representing delivery related feedback, such as customer ratings, customer preferences, experiences and the like.

Those skilled in the art will appreciate that the computing system 1900 is merely illustrative and is not intended to limit the scope of implementations. In particular, the computing system and devices may include any combination of hardware or software that can perform the indicated functions, including computers, network devices, internet appliances, wireless phones, tablets, etc. The computing system 1900 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will appreciate that, in some implementations, the functionality provided by the methods and systems discussed above may be provided in alternative ways, such as being split among more software modules or routines or consolidated into fewer modules or routines. Similarly, in some implementations, illustrated methods and systems may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. The various methods, apparatus, and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer-readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. An inventory storage system, comprising:
    a gravity feed conveyance system configured to route a plurality of inventory items to a plurality of container holders by allowing rollable containers that contain individual ones of the plurality of inventory items to roll along the gravity feed conveyance system under the force of gravity, and to exit the gravity feed conveyance system via a plurality of exits having respective sizes associated with respective critical dimensions of the rollable containers;
    a first container holder of the plurality of container holders configured to receive a first rollable container having a first critical dimension responsive to the first rollable container exiting the gravity feed conveyance system via a first exit having a first size associated with the first critical dimension; and
    a second container holder of the plurality of container holders configured to receive a second rollable container having a second critical dimension responsive to the second rollable container exiting the gravity feed conveyance system via a second exit having a second size associated with the second critical dimension;
    wherein the first critical dimension is different than the second critical dimension; and
    wherein the first size of the first exit is different than the second size of the second exit.

2. The inventory storage system of claim 1, wherein the first container holder includes:
    a helix pattern such that the first rollable container is received at a top of the first container holder and routed toward a bottom of the helix under the force of gravity.

3. The inventory storage system of claim 1, wherein:
    the first container holder is cylindrical in shape, has a width that is at least three times the first critical dimension, and has a height such that a plurality of rows of rollable containers may be stored in the first container holder.

4. The inventory storage system of claim 3, wherein:
    rollable containers are stored on a perimeter of the first container holder such that a cavity is formed within the first container holder; and
    a third rollable container having the first critical dimension that is stored in the first container holder is removed from the first container holder by displacing the third rollable container from the perimeter of the first container holder into the cavity.

5. The inventory storage system of claim 4, wherein:
    the third rollable container exits the first container holder under the force of gravity in response to the third rollable container being displaced into the cavity.

6. The inventory storage system of claim 1, wherein:
    the first container holder includes a cubic pattern having a plurality of rows and columns in which rollable containers may be stored; and
    the first rollable container is added to the first container holder at an opening at a first row and a first column of the first container holder.

7. The inventory storage system of claim 1, wherein the first rollable container has an exterior shape that is at least one of spherical, cylindrical, or ovoidal.

8. The inventory storage system of claim 1, further comprising:
    a receive area positioned at a first altitude and configured to receive inventory items;
    wherein the gravity feed conveyance system begins at the receive area and extends to the plurality of container holders, the plurality of container holders being positioned at a second altitude that is lower than the first altitude;
    a packing area positioned at a third altitude that is lower than the second altitude, the packing area configured to receive rollable containers that include items from one or more of the plurality of container holders and pack the items for shipment to a customer; and
    a shipping area configured to receive packed items from the packing area.

9. The inventory storage system of claim 8, wherein rollable containers that include items are routed from the receive area to the shipping area under the force of gravity.

10. The inventory storage system of claim 1, wherein:
    the first rollable container includes a rollable container identifier that uniquely identifies the first rollable container; and the rollable container identifier is at least one of a bar code, a quick response (QR) code, a bokode, a color, or a radio frequency identification (RFID) tag.

11. A method of routing inventory items within an inventory storage system, comprising:

routing, under the force of gravity, a first rollable container of a plurality of rollable containers along a gravity feed conveyance system, the first rollable container having a first critical dimension and containing at least one inventory item;

causing the first rollable container to exit, under the force of gravity, the gravity feed conveyance system at a first exit having a first size associated with the first critical dimension;

responsive to the first rollable container exiting the gravity feed conveyance system via the first exit, routing the first rollable container to a first container holder configured to receive rollable containers having the first critical dimension;

routing, under the force of gravity, a second rollable container of the plurality of rollable containers along the gravity feed conveyance system, the second rollable container having a second critical dimension and containing at least one inventory item;

causing the second rollable container to exit, under the force of gravity, the gravity feed conveyance system at a second exit having a second size associated with the second critical dimension; and responsive to the second rollable container exiting the gravity feed conveyance system via the second exit, routing the second rollable container to a second container holder configured to receive rollable containers having the second critical dimension;

wherein the first critical dimension is different than the second critical dimension; and wherein the first size of the first exit is different than the second size of the second exit.

12. The method of claim 11, further comprising:
receiving the first rollable container at a top of the first container holder including a helix pattern; and
routing the first rollable container toward a bottom of the helix pattern of the first container holder under the force of gravity.

13. The method of claim 12, further comprising:
removing the first rollable container from the first container holder by displacing the first rollable container from a position in the helix pattern of the first container holder into a cavity formed within the helix pattern of the first container holder such that the first rollable container exits the first container holder under the force of gravity.

14. The method of claim 11, further comprising:
receiving the first rollable container at an opening at a first row and a first column of the first container holder, the first container holder including a cubic pattern having a plurality of rows and columns in which rollable containers may be stored.

15. The method of claim 11, wherein the first rollable container has an exterior shape that is at least one of spherical, cylindrical, or ovoidal.

16. The method of claim 11, further comprising:
routing, via the gravity feed conveyance system, the first rollable container from a receive area positioned at a first altitude, the receive area configured to receive inventory items, to at least one of a packing area or a shipping area positioned at a second altitude that is lower than the first altitude, the packing area configured to receive the first rollable container containing at least one inventory item from the first container holder and pack the at least one inventory item for shipment to a customer, and the shipping area configured to receive the packed at least one inventory item from the packing area.

17. The method of claim 11, wherein:
the first rollable container includes a rollable container identifier that uniquely identifies the first rollable container; and
the rollable container identifier is at least one of a bar code, a quick response (QR) code, a bokode, a color, or a radio frequency identification (RFID) tag.

18. A computing system, comprising:
one or more processors; and
a memory coupled to the one or more processors and storing program instructions that when executed by the one or more processors cause the one or more processors to at least:

cause routing, under the force of gravity, of a first rollable container of a plurality of rollable containers along a gravity feed conveyance system, the first rollable container having a first critical dimension and containing at least one inventory item;

cause the first rollable container to exit, under the force of gravity, the gravity feed conveyance system at a first exit having a first size associated with the first critical dimension;

responsive to the first rollable container exiting the gravity feed conveyance system via the first exit, cause routing of the first rollable container to a first container holder configured to receive rollable containers having the first critical dimension;

cause routing, under the force of gravity, of a second rollable container of the plurality of rollable containers along the gravity feed conveyance system, the second rollable container having a second critical dimension and containing at least one inventory item;

cause the second rollable container to exit, under the force of gravity, the gravity feed conveyance system at a second exit having a second size associated with the second critical dimension;

responsive to the second rollable container exiting the gravity feed conveyance system via the second exit, cause routing of the second rollable container to a second container holder configured to receive rollable containers having the second critical dimension;

wherein the first critical dimension is different than the second critical dimension; and wherein the first size of the first exit is different than the second size of the second exit.

19. The computing system of claim 18, wherein the first rollable container is received at a top of the first container holder including a helix pattern and routed toward a bottom of the helix pattern of the first container holder under the force of gravity; and wherein the program instructions when executed by the one or more processors further cause the one or more processors to at least:
cause removal of the first rollable container from the first container holder by displacing the first rollable container from a position in the helix pattern of the first container holder into a cavity formed within the helix pattern of the first container holder such that the first rollable container exits the first container holder under the force of gravity.

20. The computing system of claim 18, wherein the program instructions when executed by the one or more processors further cause the one or more processors to at least:
cause routing, via the gravity feed conveyance system, of the first rollable container from a receive area positioned at a first altitude to at least one of a packing area or a shipping area positioned at a second altitude that is lower than the first altitude.

* * * * *